(12) United States Patent
Tanaka

(10) Patent No.: US 8,300,132 B2
(45) Date of Patent: Oct. 30, 2012

(54) DRIVING METHOD OF SOLID-STATE IMAGING DEVICE, SOLID-STATE IMAGING SYSTEM, AND CAMERA SYSTEM

(75) Inventor: Hiroaki Tanaka, Fukuoka (JP)

(73) Assignee: Sony Corporation, Tokyo (JP)

( * ) Notice: Subject to any disclaimer, the term of this patent is extended or adjusted under 35 U.S.C. 154(b) by 743 days.

(21) Appl. No.: 11/090,111

(22) Filed: Mar. 28, 2005

(65) Prior Publication Data
US 2006/0017831 A1   Jan. 26, 2006

(51) Int. Cl.
*H04N 3/14* (2006.01)
*H04N 5/335* (2006.01)

(52) U.S. Cl. .......................... 348/317; 348/312
(58) Field of Classification Search ........... 348/311–324
See application file for complete search history.

(56) References Cited

U.S. PATENT DOCUMENTS

| | | | | |
|---|---|---|---|---|
| 6,075,565 A * | 6/2000 | Tanaka et al. | ................. | 348/312 |
| 6,160,580 A * | 12/2000 | Nakashiba | .................... | 348/320 |
| 6,356,305 B1 * | 3/2002 | Akagawa | ...................... | 348/311 |
| 6,583,818 B1 * | 6/2003 | Toma | ............................ | 348/312 |
| 6,809,764 B1 * | 10/2004 | Misawa et al. | ................ | 348/272 |
| 6,980,245 B1 * | 12/2005 | Ooki | .............................. | 348/311 |
| 7,433,099 B2 * | 10/2008 | Kondo | .......................... | 358/516 |
| 2003/0030737 A1 * | 2/2003 | Yanai | ............................. | 348/296 |
| 2003/0169346 A1 * | 9/2003 | Ojima et al. | ............. | 348/207.99 |

FOREIGN PATENT DOCUMENTS

| | | |
|---|---|---|
| JP | 10-013742 | 1/1998 |
| JP | 11-275464 | 10/1999 |
| JP | 11-355663 | 12/1999 |

OTHER PUBLICATIONS

Japanese Office Action issued Aug. 30, 2011 for related Japanese Application No. 2009-160771.

* cited by examiner

*Primary Examiner* — Nelson D. Hernández Hernández
(74) *Attorney, Agent, or Firm* — Rader Fishman & Grauer, PLLC

(57) ABSTRACT

A driving method of a solid-state imaging device vertically transfers a signal charge obtained by photoelectric conversion and horizontally transfers the signal charge vertically transferred to output an imaging signal corresponding to the signal charge. For every charge packet unit for transferring the signal charge, the charge packet unit being formed of columns of transfer channels used in the vertical transfer, a backward transfer channel behind the charge packet in a vertical transfer direction is turned off substantially simultaneously with turning on of a forward transfer channel ahead of the charge packet.

13 Claims, 24 Drawing Sheets

HORIZONTAL-RATE TIMING CHART (EMBODIMENT OF THE PRESENT INVENTION)
FOUR-FIELD READOUT MODE (FRAME READOUT MODE)

CHARGE TRANSFER STATE (EMBODIMENT OF THE PRESENT INVENTION)
FOUR-FIELD READOUT MODE (FRAME READOUT MODE)

VERTICAL-RATE TIMING CHART

THREE-FIELD READOUT MODE (FRAME READOUT MODE)

HORIZONTAL-RATE TIMING CHART (EMBODIMENT OF THE PRESENT INVENTION)

THREE-FIELD READOUT MODE (FRAME READOUT MODE)

ONE TRANSFER PACKET UNIT

TRANSFER DIRECTION
CHARGE TRANSFER STATE (EMBODIMENT OF THE PRESENT INVENTION)

THREE-FIELD READOUT MODE (FRAME READOUT MODE)

FOUR-FIELD READOUT MODE (FRAME READOUT MODE)

HORIZONTAL-RATE TIMING CHART (EMBODIMENT OF THE PRESENT INVENTION)

FOUR-FIELD READOUT MODE (FRAME READOUT MODE)

CHARGE TRANSFER STATE (EMBODIMENT OF THE PRESENT INVENTION)

FOUR-FIELD READOUT MODE (FRAME READOUT MODE)

BASIC

NO DIFFERENCE IN DELAY

CHANGE IN φV1 OCCURS SLIGHTLY EARLIER THAN CHANGE IN φV5

CHANGE IN φV1 OCCURS CONSIDERABLY EARLIER THAN CHANGE IN φV5

OPERATION IN TWO-FIELD READOUT MODE AND 2/8 LINE DECIMATION READOUT MODE
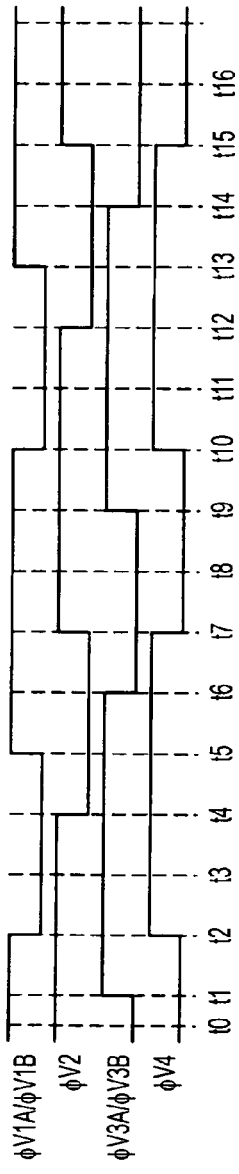
FIG. 15A
FIG. 15B
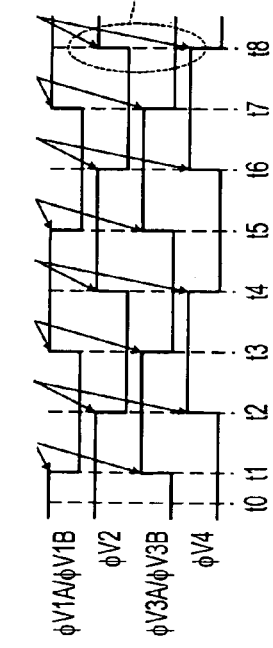
FIG. 15C
FIG. 15D-1
DIFFERENCE IN TECHNIQUE BETWEEN EMBODIMENT AND PATENT DOCUMENT 1
OUTPUT FROM TIMING-SIGNAL GENERATOR
SUBSTANTIALLY SIMULTANEOUSLY PERMIT CERTAIN SHIFT
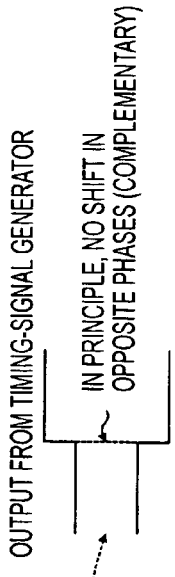
FIG. 15D-2
OUTPUT FROM TIMING-SIGNAL GENERATOR
IN PRINCIPLE, NO SHIFT IN OPPOSITE PHASES (COMPLEMENTARY)
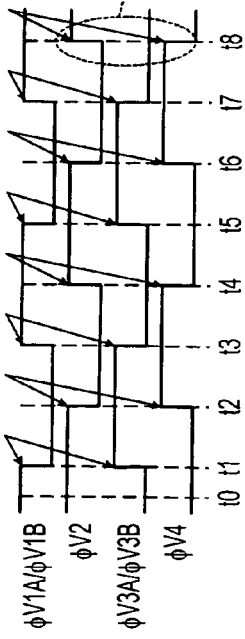

VERTICAL-RATE TIMING CHART

HORIZONTAL-RATE TIMING CHART (RELATED EXAMPLE)

TRANSFER DIRECTION
CHARGE TRANSFER STATE (RELATED EXAMPLE)

TWO-FIELD READOUT MODE (FRAME READOUT MODE)

NOTE: PARTS FILLED WITH BLACK SHOW PIXELS NOT TO BE READ OUT.

VERTICAL-RATE TIMING CHART

2/8 LINE DECIMATION READOUT MODE

HORIZONTAL-RATE TIMING CHART (RELATED EXAMPLE)

2/8 LINE DECIMATION READOUT MODE

ONE TRANSFER PACKET UNIT
TRANSFER DIRECTION
CHARGE TRANSFER STATE (RELATED EXAMPLE)
2/8 LINE DECIMATION READOUT MODE

HORIZONTAL-RATE TIMING CHART (IMPROVED EXAMPLE)
2/8 LINE DECIMATION READOUT MODE

TRANSFER DIRECTION
CHARGE TRANSFER STATE (IMPROVED EXAMPLE)
2/8 LINE DECIMATION READOUT MODE

HORIZONTAL-RATE TIMING CHART (RELATED EXAMPLE)

THREE-FIELD READOUT MODE (FRAME READOUT MODE)

CHARGE TRANSFER STATE (RELATED EXAMPLE)

THREE-FIELD READOUT MODE (FRAME READOUT MODE)

DRIVING METHOD OF SOLID-STATE IMAGING DEVICE, SOLID-STATE IMAGING SYSTEM, AND CAMERA SYSTEM

BACKGROUND OF THE INVENTION

1. Field of the Invention

The present invention relates to a driving method of a solid-state imaging device (image sensor) for imaging an object and outputting an image signal in accordance with the image of the object, a solid-state imaging system having the solid-state imaging device and a driving unit, and a camera system. For example, the driving method, the solid-state imaging system, and the camera system are preferably used in an electronic still camera.

2. Description of the Related Art

Recently, electronic still cameras (digital still cameras) have been increasingly in widespread use. Since capturing still pictures at a high resolution is required in such electronic still cameras, mechanisms for independently outputting the signals of all pixels without mixing are adopted. For example, when CCD imaging devices are used, a so-called all-pixels readout mode or a so-called frame readout mode (refer to FIGS. 16 to 19) is employed. In the all-pixels readout mode, all pixels are read out at the same time and the signal charges of the pixels are independently output without mixing them in the vertical CCDs (vertical registers). In the frame readout mode, mechanical shutters are used and the signal charges of odd-numbered lines and even-numbered lines are alternately read out for every field and supplied to vertical CCDs to independently transfer the signal charges of pixels.

As an example of a method for increasing the data rate of the signals output from imaging devices in the capture of still images, a line decimation readout mode (refer to FIGS. 20 to 23) has been suggested. In the line decimation readout mode, since empty packets, having no signal charge, behind a packet including a signal charge Qs are mixed in the horizontal register to eliminate a period having no signal, it is necessary to perform vertical transfer corresponding to a predetermined number of lines (for example, two lines) during a horizontal blanking period. It is assumed here that the horizontal blanking period during which the vertical transfer is performed is the same in the two operation modes (the frame readout mode and the decimation readout mode) (refer to FIGS. 18 and 22). When the overlap period of the vertical transfer clocks is represented by "x", in the line decimation readout mode, the overlap period of the vertical transfer clocks is represented by "½x" because the vertical transfer corresponding to two lines is performed, as shown in FIG. 22. Accordingly, the transfer efficiency is decreased and it is necessary to drive the vertical transfer at a speed higher than that in the frame readout mode.

However, when the vertical transfer is driven at a higher speed, a reduction in drive voltage caused by a electrode resistance or a propagation delay in drive pulses occurs at positions far from the input terminals of the vertical transfer clocks (for example, at an opposing side in one-side input, as shown in FIG. 24B, or in the center of the device in two-sides input, as shown in FIG. 24C), to produce a phenomenon including an obtuse drive waveform shown in FIG. 24A. In such a case, the transfer efficiency of the vertical CCDs is decreased and/or the amount of processed charge is decreased. A driver is omitted in FIGS. 24B and 24C.

The inventor has suggested one method for solving such problems in, for example, Japanese Unexamined Patent Application Publication No. 10-013742 (hereinafter referred to as Patent Document 1) (refer to FIGS. 25 and 26 showing the outline of this method). According to the method disclosed in Patent Document 1, as shown in FIG. 25, the vertical transfer is performed by using a combination of pairs of vertical transfer clocks having opposite phases during the vertical transfer for four-phase drive to prolong the overlap period of the vertical transfer clocks. Accordingly, even in the line decimation readout mode, it is possible to perform the vertical transfer in a state in which a longer overlap period (equal to "x" shown in FIG. 18), as in the two-field/frame readout mode, is secured to improve the transfer efficiency of the vertical CCDs.

In recent years, the cell size has been increasingly reduced for increasing the resolution (increasing the number of pixels) or for reducing the size of the device. In the frame readout mode, a three-field readout mode (refer to FIGS. 6 and 7 described below) and a four-field readout mode (refer to FIGS. 10 and 11 described below) have been come into practical use, in addition to a two-field readout mode, in related arts, in which the frame is divided into two fields for readout.

However, in a three-or-more-field frame readout mode, the overlap period is reduced to decrease the efficiency of the vertical transfer not only in the line decimation readout operation but also in the frame readout operation. For example, when the horizontal blanking period during which the vertical transfer is performed is the same as in the two-field readout mode, the overlap period of the vertical transfer clocks is represented by "x" in the two-field readout mode (FIG. 18) while the overlap period of the vertical transfer clocks is represented by "⅔x" in the three-field readout mode shown in FIGS. 27 and 28. In addition, although not shown in the figures, the overlap period of the vertical transfer clocks is represented by "¼x" in the four-field readout mode. Accordingly, a propagation delay occurs in the vertical transfer clocks and the waveform becomes obtuse, as shown in FIG. 24A, at a position far from the input terminals of the clocks. As a result, the transfer efficiency of the vertical registers is decreased and/or the amount of processed charge is decreased. The same applies to a five-or-more-field readout mode.

Although the reduced amount of processed charge in the vertical registers is relatively small in the three-or-more-field readout mode because the number of the on transfer channels in the vertical registers in the three-or-more-field readout mode is greater than that in the two-field readout mode, the transfer efficiency is decreased.

The decrease in the transfer efficiency can be inhibited by setting the transfer speed of the vertical CCDs (the overlap period of the vertical transfer clocks) as in the two-field readout mode while maintaining the frame rate by increasing the horizontal drive frequency.

However, increasing the horizontal drive frequency causes the decrease in the transfer efficiency of the horizontal CCDs. In addition, new problems including an increase in the power consumption of the horizontal CCDs, an increase in the cost of used components, and a decrease in the S/N ratio are caused as the frequency is increased. Hence, it is not preferable that the horizontal drive frequency be increased.

It is preferable that the method disclosed in Patent Document 1 be utilized. However, although the method disclosed in Patent Document 1 is effective for application to the line decimation readout mode in contradistinction to the above two-field readout mode, the method is not necessarily applicable to the drive for any number of fields or any number of phases in the three-field readout mode or a more-than-three-field (for example, a four, a five, or more-than-five-field) readout mode. This is because, for example, the method disclosed in Patent Document 1 cannot be applied to the drive for an odd number of phases owing to a basic restriction in that the vertical transfer is performed by using a combination of pairs of the vertical transfer clocks having opposite phases (complementary). The method disclosed in Patent Document 1 is not a versatile method for solving the problem of a decrease in the efficiency of the vertical transfer in various readout modes.

SUMMARY OF THE INVENTION

It is desirable to provide a driving method of a solid-state imaging device, which is capable of solving the problem of a decrease in the transfer efficiency when the vertical transfer is driven in various readout modes having various number of fields and which is versatile, a solid-state imaging system, and a camera system.

According to an embodiment of the present invention, there is provided a driving method of a solid-state imaging device for vertically transferring a signal charge obtained by photoelectric conversion and horizontally transferring the signal charge vertically transferred to output an imaging signal corresponding to the signal charge. For every charge packet unit for transferring the signal charge, a transfer channel behind the charge packet (hereinafter also referred to as a backward transfer channel) in a vertical transfer direction is turned off substantially simultaneously with turning on of a transfer channel ahead of the charge packet (hereinafter also referred to as a forward transfer channel). The charge packet unit is formed of columns of transfer channels used in the vertical transfer.

According to another embodiment of the present invention, there is provided a solid-state imaging system including the solid-state imaging device and a driving unit for driving the solid-state imaging device. The driving unit includes a timing-signal generator for generating a vertical transfer clock at a timing at which, for every charge packet unit for transferring the signal charge, the charge packet unit being formed of columns of transfer channels used in the vertical transfer, a backward transfer channel behind the charge packet in a vertical transfer direction is turned off substantially simultaneously with turning on of a forward transfer channel ahead of the charge packet. It is sufficient for the driving unit to be a unit having a function of generating the vertical transfer clock at the timing described above, and the driving unit may be a so-called timing generator. According to another embodiment of the present invention, there is provided a camera system further including an imaging lens for focusing an optical image of an object on the imaging surface of the solid-state imaging device, in addition to the structure of the solid-state imaging system according to an embodiment of the present invention.

With the structures according to the embodiments of the present invention described above, the vertical transfer can be performed in a state having a longer overlap period of the vertical transfer clock by driving the vertical transfer unit such that, in the vertical transfer, the backward transfer channel behind the charge packet in the vertical transfer direction is turned off substantially simultaneously with turning on of the forward transfer channel ahead of the charge packet.

Although the drive timing described above can also be applied to a four-phase driving method, it is particularly and preferably applicable to driving of a vertical transfer unit having multiple phases more than four (for example, six, eight, or more than eight phases). The method in the four-phase driving mode disclosed in Patent Document 1 can not necessarily be applied to such driving.

BRIEF DESCRIPTION OF THE DRAWINGS

FIGS. 15A to 15D-2 are diagrams illustrating the operation in a two-field readout mode and 2/8 line decimation readout mode;

DESCRIPTION OF THE PREFERRED EMBODIMENT

<Structure of Digital Still Camera>

Embodiments of the present invention will be described below with reference to the attached drawings.

Figure 1:
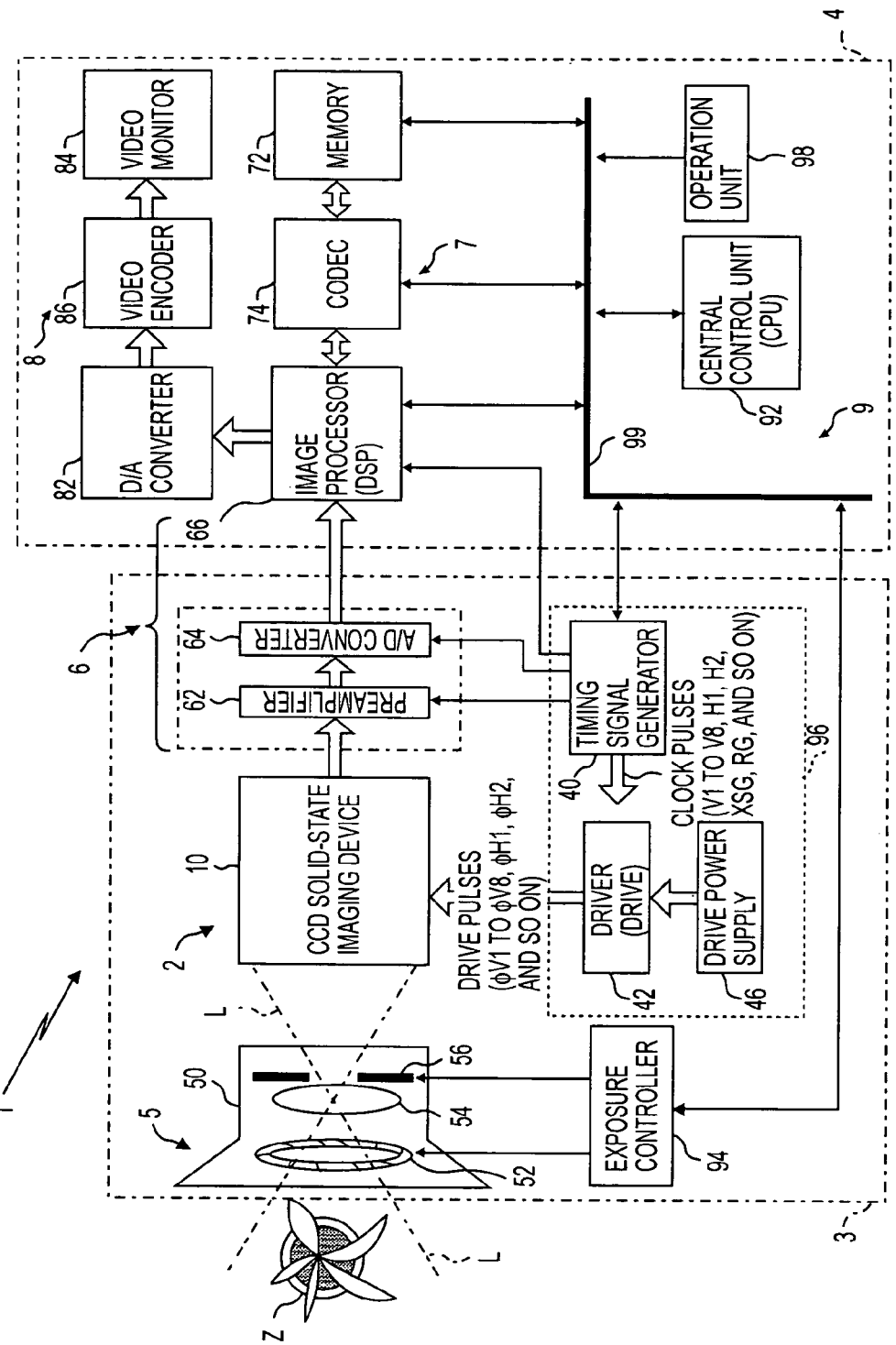
FIG. 1 is a schematic block diagram showing an imaging system according to an embodiment of the present invention.

FIG. 1 is a schematic block diagram showing an imaging system according to an embodiment of the present invention. Referring to FIG. 1, the imaging system (camera system) is structured as a digital still camera 1 having an imaging module 3 including a charge coupled device (CCD) solid-state imaging device 10, an imaging lens 50, and a drive controlling unit 96 for driving the CCD solid-state imaging device 10, and a main unit 4 for generating a video signal based on an imaging signal supplied from the imaging module 3 to display an image on a monitor or to store the image in a certain storage medium.

The drive controlling unit 96 in the imaging module 3 includes a timing-signal generator 40 that generates various pulse signals for driving the CCD solid-state imaging device 10, a driver (drive) 42 that converts the pulse signals received from the timing-signal generator 40 into drive pulses for driving the CCD solid-state imaging device 10, and a drive power supply 46 that supplies power to the CCD solid-state imaging device 10 and the driver 42. The CCD solid-state imaging device 10 and the drive controlling unit 96 in the imaging module 3 define a solid-state imaging system 2. The CCD solid-state imaging device 10 and the drive controlling unit 96 are preferably provided on a circuit board or on a semiconductor substrate to form the solid-state imaging system 2.

The processing line of the digital still camera 1 is roughly divided into an optical system 5, a signal processing system 6, a recording system 7, a display system 8, and a control system 9. The imaging module 3 and the main unit 4 are housed in a casing (not shown) to form an actual product (end product).

The optical system 5 includes the imaging lens 50 including a shutter 52, a lens 54 for condensing an optical image of an object, and an aperture 56 for adjusting the light intensity of the optical image, and the CCD solid-state imaging device 10 for performing photoelectric conversion for the condensed optical image to convert the optical image into an electrical signal. Light L from an object Z is transmitted through the shutter 52 and the lens 54, is adjusted by the aperture 56, and is incident on the CCD solid-state imaging device 10 with an appropriate brightness. The lens 54 adjusts a focal position such that the image generated by the light L from the object Z focuses on the CCD solid-state imaging device 10.

The signal processing system 6 includes a preamplifier 62 including an amplifier for amplifying an analog imaging signal supplied from the CCD solid-state imaging device 10, a correlated double sampling (CDS) circuit for sampling the amplified imaging signal to reduce noise, and so on; an analog-to-digital (A/D) converter 64 for converting the analog signal output from the preamplifier 62 into a digital signal; and an image processor 66, which is a digital signal processor (DSP) for performing predetermined image processing for the digital signal supplied from the A/D converter 64.

The recording system 7 includes a memory (storage medium) 72, such as a flash memory, for storing the image signal and a coder-decoder (CODEC) 74 for encoding the image signal processed by the image processor 66 to record the encoded signal in the memory 72 and/or for reading the signal from the memory 72 and decoding the readout signal to supply the decoded signal to the image processor 66.

The display system 8 includes a digital-to-analog (D/A) converter 82 for converting the image signal processed by the image processor 66 into an analog signal, a video monitor 84, for example a liquid crystal display (LCD), serving as a finder by displaying an image corresponding to the input video signal, and a video encoder 86 for encoding the analog image signal into the video signal having a format appropriate for the downstream video monitor 84.

The control system 9 includes a central control unit 92, for example, a central processing unit, for controlling a drive (driving unit) (not shown) to read out a control program stored in a magnetic disc, an optical disc, a magneto-optical disc, or a semiconductor memory and for controlling the entire digital still camera 1 based on the readout control program or commands input by a user.

The control system 9 further includes an exposure controller 94 for controlling the shutter 52 and the aperture 56 such that the image supplied to the image processor 66 keeps an appropriate brightness, the drive controlling unit 96 including the timing-signal generator 40 (timing generator; TG) for controlling the operation timing of each component from the CCD solid-state imaging device 10 to the image processor 66, and an operation unit 98 with which the user inputs a command of instructing a shutter timing or other commands. The central control unit 92 controls the image processor 66, the CODEC 74, the memory 72, the exposure controller 94, and the timing-signal generator 40, which are connected to a bus 99 of the digital still camera 1.

The digital still camera 1 has an automatic control unit for controlling automatic focus (AF), automatic white balance (AWB), automatic exposure (AE), and the like. Such functions are controlled by using output signals supplied from the CCD solid-state imaging device 10. For example, the control value of the exposure controller 94 is set by the central control unit 92 such that the image supplied to the image processor 66 keeps an appropriate brightness, and the exposure controller 94 controls the aperture 56 in accordance with the set control value. Specifically, the central control unit 92 acquires an appropriate number of sample values of luminance from the image stored in the image processor 66 and sets the control value of the aperture 56 such that the average value of the sample values is within a predetermined range of luminance.

The timing-signal generator 40, which characterizes the digital still camera 1 of this embodiment, is controlled by the central control unit 92. The timing-signal generator 40 generates timing pulses required for operating the CCD solid-state imaging device 10, the preamplifier 62, the A/D converter 64, and the image processor 66 and supplies the timing pulses to these components. The operation unit 98 is operated by the user for operating the digital still camera 1.

Although the preamplifier 62 and the A/D converter 64 in the signal processing system 6 are included in the imaging module 3 in the embodiment shown in FIG. 1, the digital still camera 1 is not limited to this structure. The preamplifier 62 and the A/D converter 64 may be provided in the main unit 4. In addition, the D/A converter 82 may be provided in the image processor 66.

Although the timing-signal generator 40 is included in the imaging module 3, the digital still camera 1 is not limited to this structure and the timing-signal generator 40 may be provided in the main unit 4. Although the timing-signal generator 40 is separated from the driver 42, the digital still camera 1 is not limited to this structure and the timing-signal generator 40 may be integrated with the driver 42 (a timing generator including a driver). Integrating the timing-signal generator 40 with the driver 42 can realize a more compact (small) digital still camera 1.

Although the circuits of the timing-signal generator 40 and the driver 42 may be formed of discrete members, it is preferable that the timing-signal generator 40 and the driver 42 be formed on a semiconductor substrate to be provided as an integrated circuit (IC). Such a structure not only realizes a compact design but also makes the handling of the member easy. In addition, such a structure reduces the cost of the timing-signal generator 40 and the driver 42 and allows the digital still camera 1 to be easily manufactured. Mounting the timing-signal generator 40 and the driver 42, which are strongly related to the used CCD solid-state imaging device 10, on a common substrate together with the CCD solid-state imaging device 10 to integrate the timing-signal generator 40 and the driver 42 with the CCD solid-state imaging device 10 or providing the timing-signal generator 40 and the driver 42 in the imaging module 3 to integrate them with the imaging module 3 allows the members to be easily handled or managed. In such cases, since the timing-signal generator 40 and the driver 42 are integrated as a module, the end product of the digital still camera 1 can be easily manufactured. The imaging module 3 may only include the optical system 5.

Specifically, the digital still camera 1 is a camera capable of picking up a color image during a still-image imaging operation in a frame readout mode. The frame readout mode is not limited to a common two-field readout mode. The digital still camera 1 of this embodiment is characterized in that a three-field, four-field, five-field, or more-than-five field readout mode can be applied to the digital still camera 1 owing to the combination with the CCD solid-state imaging device 10. Furthermore, the digital still camera 1 can be used not only in the still-image imaging mode but also in a motion-picture capturing mode in which motion pictures are captured at a frame rate close to 30 frames/sec (for example, 10 frames/sec or high) in a decimation readout mode.

<Overview of CCD Solid-State Imaging Device and Peripheral Parts>

Figure 2:
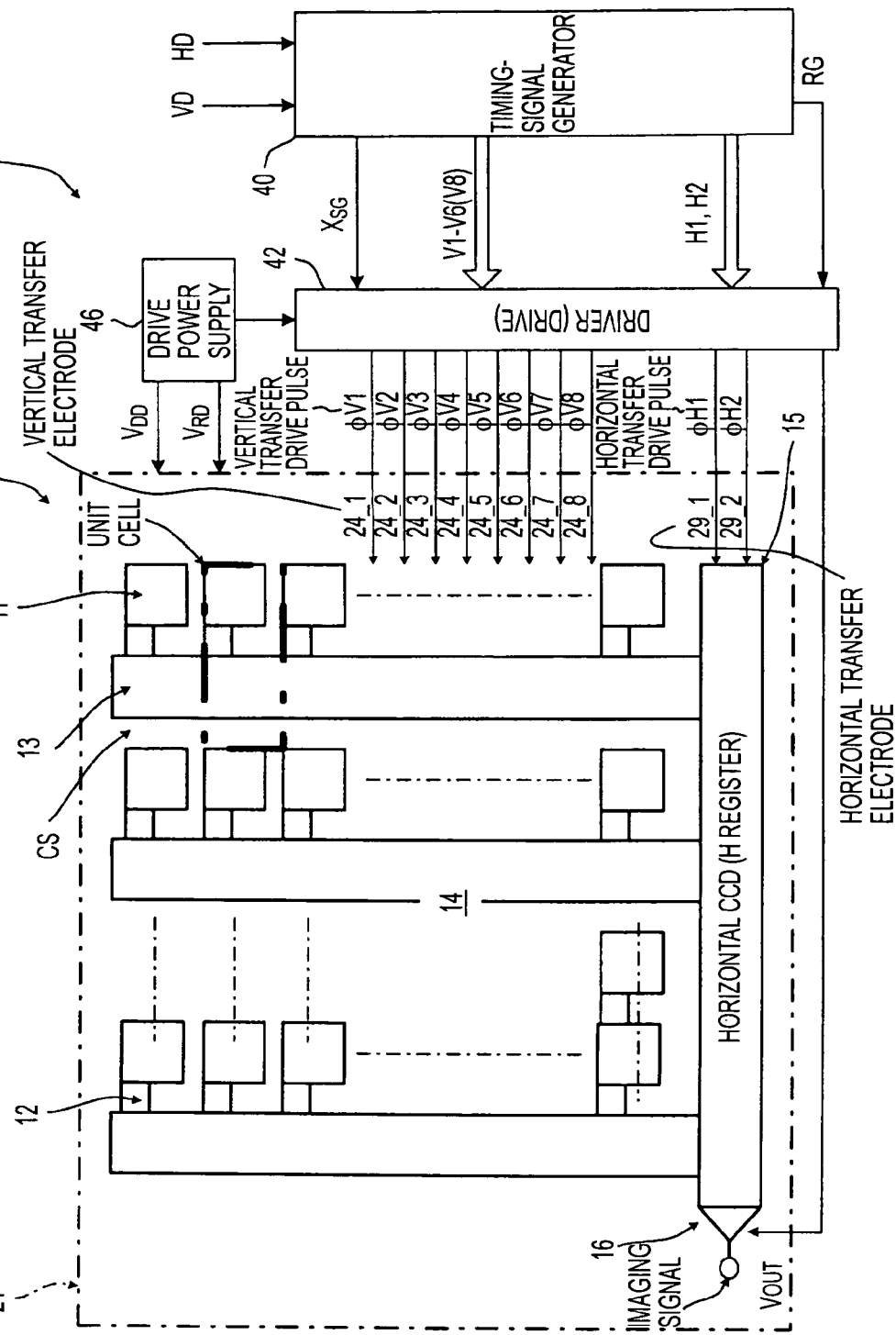
FIG. 2 is a schematic diagram of a solid-state imaging system including a CCD solid-state imaging device and an embodiment of the drive controlling unit.

FIG. 2 is a schematic diagram of the solid-state imaging system 2 including the CCD solid-state imaging device 10 and an embodiment of the drive controlling unit 96 for driving the CCD solid-state imaging device 10. According to this embodiment, a case in which the CCD solid-state imaging device 10 in an interline transfer (IT) mode is driven in six phases or in eight phases will be exemplified.

Referring to FIG. 2, the drive power supply 46 applies a drain voltage VDD and a reset drain voltage VRD to the CCD solid-state imaging device 10 and applies a predetermined voltage to the driver 42.

The CCD solid-state imaging device 10 in the solid-state imaging system 2 has a plurality of sensors (photosensitive units; photocells) 11 arranged in a two-dimensional matrix in the vertical (column) direction and the horizontal (row) direction on a semiconductor substrate 21. The sensors are, for example, photodiodes, which are examples of light receiving devices, corresponding to pixels (unit cells). The sensors 11 convert light beams, which are incident on the light receiving surfaces of the sensors 11, into signal charges corresponding to the light intensity of the light beams and store the signal charges.

The CCD solid-state imaging device 10 has vertical CCDs 13 (V registers, vertical transfer units), each having a plurality of (six or eight per unit cell in this embodiment) vertical transfer electrodes 24 (24-1 to 24-6 or 24-1 to 24-8) corresponding to the six-phase drive or eight-phase drive for every vertical column of the sensors 11.

The transfer direction of the vertical CCDs 13 is the vertical direction in FIG. 2. The vertical CCDs 13 are provided in the vertical direction, and the multiple vertical transfer electrodes 24 are arranged in a direction perpendicular to the vertical direction (horizontal direction). Readout gates (ROG) 12 are provided between the vertical CCDs 13 and the sensors 11. Channel stops CS are provided in the boundaries between the unit cells. The plurality of vertical CCDs 13, which are provided for every vertical column of the sensors 11 and which vertically transfer signal charges read out from the sensors 11 by the readout gates 12, constitute an imaging area 14.

The signal charges stored in the sensors 11 are read out and supplied to the vertical CCDs 13 when the drive pulses corresponding to readout pulses XSG are applied to the readout gates 12. The vertical CCDs 13 are subject to transfer drive in response to drive pulses $\phi V1$ to $\phi V6$ ($\phi V8$) based on vertical transfer clocks V1 to V6 (V8) of the six phases (eight phases) to vertically and sequentially transfer the readout signal charges for every part corresponding to one scanning line (one line) during part of a horizontal blanking period. The vertical transfer for every line is particularly referred to as a line shift.

The CCD solid-state imaging device 10 has a horizontal CCD 15 (H register, horizontal transfer unit) extending in the horizontal direction in FIG. 2. The horizontal CCD 15 adjoins the transfer-direction ends of the multiple vertical CCDs 13, that is, the undermost parts of the vertical CCDs 13. The horizontal CCD 15 is subject to transfer drive in response to drive pulses $\phi H1$ and $\phi H2$ based on horizontal transfer clocks H1 and H2 of, for example, two phases to horizontally and sequentially transfer the signal charges, corresponding to one line, transferred from the multiple vertical CCDs 13 during a horizontal scanning period after the horizontal blanking period. Accordingly, a plurality of (two) horizontal transfer electrodes 29 (29-1 and 29-2) corresponding to the two-phase drive is provided.

At the transfer-direction end of the horizontal CCD 15, a charge-to-voltage converter 16 having, for example, a floating diffusion amplifier (FDA) structure, is provided. The charge-to-voltage converter 16 sequentially converts the signal charges horizontally transferred by the horizontal CCD 15 into voltage signals and outputs the converted signals. The voltage signals are output as CCD outputs (VOUT) corresponding to the amount of light from the object. The CCD solid-state imaging device 10 in the interline transfer mode is structured in this manner.

The solid-state imaging system 2 of this embodiment includes the timing-signal generator 40, which generates various pulse signals (two values of "L" level and "H" level) for driving the CCD solid-state imaging device 10, and the driver 42, which converts the various pulses supplied from the timing-signal generator 40 into drive pulses having predetermined levels and supplies the converted drive pulses to the CCD solid-state imaging device 10. For example, the timing-signal generator 40 generates, based on a horizontal synchronization signal (HD) and a vertical synchronization signal (VD), the readout pulses XSG for reading out the signal charges stored in the sensors 11 in the CCD solid-state imaging device 10, the vertical transfer clocks V1 to Vn (n denotes the number of phases at the time of driving; for example, Vn is V6 in the six-phase drive and Vn is V8 in the eight-phase drive) for performing the vertical transfer drive for the readout signal charges and transferring the signal charges to the horizontal CCD 15, the horizontal transfer clocks H1 and H2 for performing the horizontal transfer drive for the signal charges transferred from the vertical CCDs 13 and transferring the signal charges to the charge-to-voltage converter 16, a reset pulse RG, and so on, and supplies the pulses to the driver 42.

The driver 42 converts the various timing signals supplied from the timing-signal generator 40 into the voltage signals (drive pulses) having predetermined levels or into other signals and supplies the signals to the CCD solid-state imaging device 10. For example, the n-phase vertical transfer clocks V1 to V6 (V8) supplied from the timing-signal generator 40 are converted into the drive pulses $\phi$V1 to $\phi$V6 ($\phi$V8) through the driver 42, and the converted drive pulses $\phi$V1 to $\phi$V6 ($\phi$V8) are applied to the corresponding vertical transfer electrodes (24-1 to 24-6 or 24-1 to 24-8) in the CCD solid-state imaging device 10. Similarly, the two-phase horizontal transfer clocks H1 and H2 are converted into the drive pulses $\phi$H1 and $\phi$H2 through the driver 42, and the converted drive pulses are applied to the corresponding horizontal transfer electrodes (29-1 and 29-2) in the CCD solid-state imaging device 10.

The driver 42 superimposes the readout pulses XSG on the vertical transfer clocks V1, V3, and V5 (and V7), among the sixth-phase or eighth-phase vertical transfer clocks V1 to V6 (V8), to convert the pulses into the vertical transfer drive pulses $\phi$V1, $\phi$V3, and $\phi$V5 (and $\phi$V7) having a three-value level and supplies the pulses to the CCD solid-state imaging device 10. In other words, the vertical transfer drive pulses $\phi$V1, $\phi$V3, and $\phi$V5 (and $\phi$V7) are used not only in the vertical transfer drive but also in the readout of the signal charges (refer to FIGS. 7 and 11 described below).

An outline of a sequential operation of the CCD solid-state imaging device 10 having the structure described above will now be described. First, the timing-signal generator 40 generates various pulse signals including the vertical transfer clocks V1 to V6 (V8) and the readout pulses XSG. These pulse signals are converted into the drive pulses having predetermined levels by the driver 42 and are supplied to predetermined terminals of the CCD solid-state imaging device 10.

The signal charges stored in the sensors 11 are read out and supplied to the vertical CCDs 13 through the corresponding readout gates 12 when the readout pulses XSG supplied from the timing-signal generator 40 are applied to transfer-channel terminal electrodes in the readout gates 12 to increase the potential below the transfer-channel terminal electrodes. The vertical CCDs 13 that are driven based on the sixth-phase (eighth-phase) vertical transfer drive pulses $\phi$V1 to $\phi$V6 ($\phi$V8) cause the signal charges to be sequentially transferred to the horizontal CCD 15.

The horizontal CCD 15 horizontally and sequentially transfers the signal charges corresponding to one line, which are vertically transferred from the multiple vertical CCDs 13, to the charge-to-voltage converter 16 based on the two-phase horizontal drive pulses $\phi$H1 and $\phi$H2, which are supplied from the timing-signal generator 40 and converted into the predetermined voltage levels by the driver 42.

The charge-to-voltage converter 16 stores the signal charges sequentially supplied from the horizontal CCD 15 in a floating diffusion (not shown). The charge-to-voltage converter 16 then converts the stored signal charges into the signal voltages and outputs the converted signal voltages as the imaging signals (CCD output signals) VOUT through, for example, an output circuit (not shown) having a source follower structure under the control of the reset pulse RG supplied from the timing-signal generator 40.

In the CCD solid-state imaging device 10 described above, the signal charges detected in the imaging area 14 having the sensors 11 two-dimensionally arranged are vertically transferred to the horizontal CCD 15 by the vertical CCDs 13, which are provided corresponding to the vertical columns of the sensors 11, and are then horizontally transferred by the horizontal CCD 15 based on the two-phase horizontal drive pulses $\phi$H1 and $\phi$H2. The charge-to-voltage converter 16 converts the signal charges into voltages corresponding to the signal charges supplied from the horizontal CCD 15 and outputs the converted voltages. The steps described above are repeated in the CCD solid-state imaging device 10.

<Specific Structure of Imaging Area>

Figure 3:
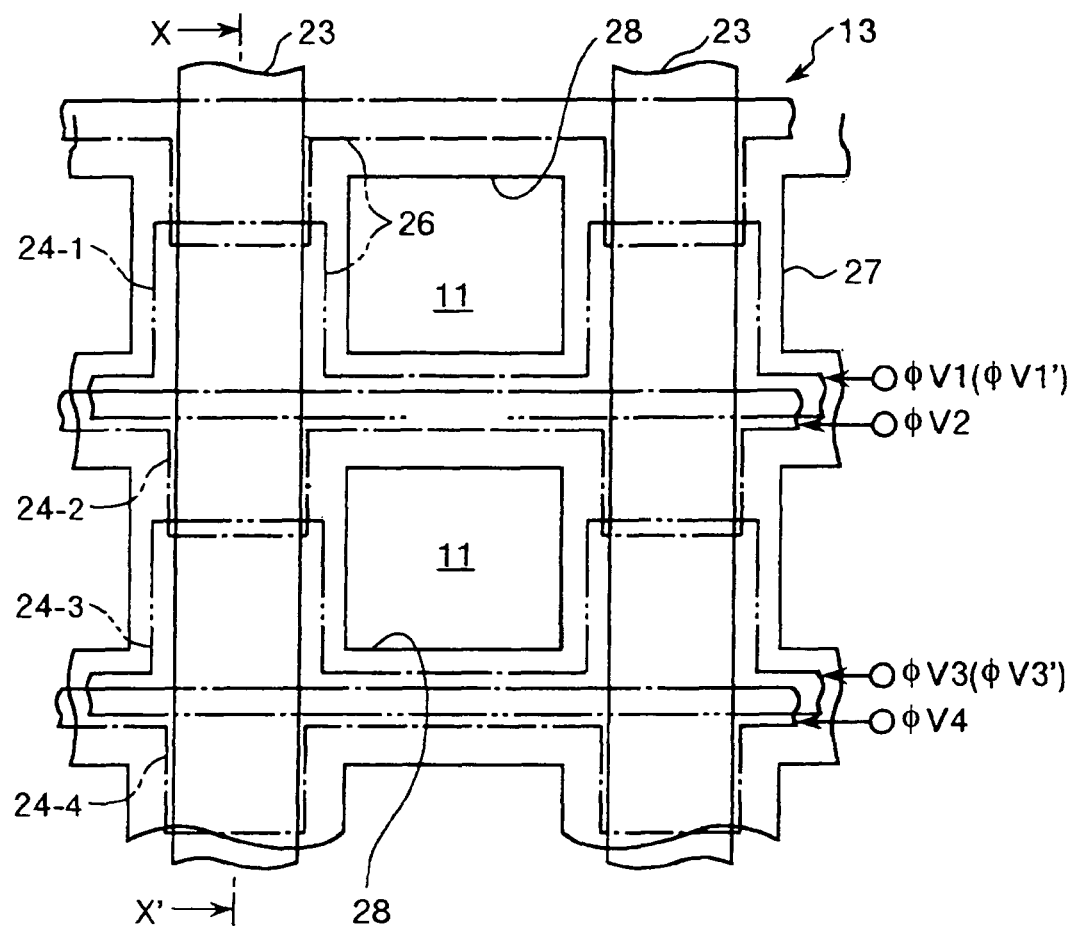
FIG. 3 is a pattern diagram showing an example of a specific structure of an imaging area.
Figure 4:
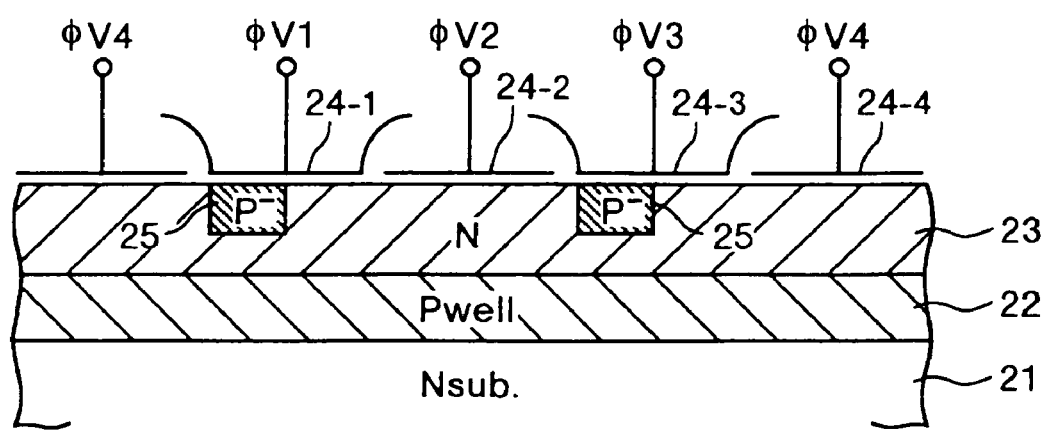
FIG. 4 is a cross-sectional view taken along line X-X' in FIG. 3.

FIG. 3 is a pattern diagram showing an example of a specific structure of the imaging area 14. FIG. 4 is a cross-sectional view taken along line X-X' in FIG. 3. Although only the vertical transfer electrodes 24-1 to 24-4 corresponding to two pixels are shown in FIGS. 3 and 4, the vertical transfer electrodes 24-5 to 24-8 are arranged in the same manner as in FIGS. 3 and 4.

The vertical CCD 13 has transfer channels 23, each being made of N-type impurities and being formed on an N-type substrate 21 with a P-type well 22 sandwiched therebetween, and the four-phase vertical transfer electrodes 24-1 to 24-4 arranged in the transfer direction on the transfer channel 23. The wiring pattern of the vertical transfer electrodes 24-1 to 24-4 are basically the same as patterns in related arts.

Among the vertical transfer electrodes 24-1 to 24-4, the second-phase vertical transfer electrode 24-2 and the fourth-phase vertical transfer electrode 24-4 are formed of a first polysilicon layer (shown by chain lines in FIG. 3), and the first-phase vertical transfer electrode 24-1 and the third-phase vertical transfer electrode 24-3 are formed of a second polysilicon layer (shown by two-dot chain lines in FIG. 3). Accordingly, the vertical transfer electrodes 24-1 to 24-4 have a two-layer electrode structure. The material of the vertical transfer electrodes 24-1 to 24-4 is not necessarily limited to polysilicon.

P-type impurity layers 25 are respectively formed below the first-phase and third-phase vertical transfer electrodes 24-1 and 24-3. Each of the P-type impurity layer 25 is formed in a substantially half area at the upstream side of the transfer direction of the signal charges (a direction from left to right in FIG. 4) above the substrate. Accordingly, a potential gradient descending toward the transfer direction of the signal charges is formed in the transfer channel 23 formed in areas below the first-phase and third-phase vertical transfer electrodes 24-1 and 24-3. As a result, the signal charges transferred to the bottom of the vertical transfer electrodes 24-1 and 24-3 gradually move toward the bottom of the vertical transfer electrodes 24-2 and 24-4 due to the potential gradient. The formation of the potential gradient is combined with a prolonged overlap period of the vertical transfer clocks to improve the transfer efficiency.

The first and second polysilicon layers of which the vertical transfer electrodes 24-1 to 24-4 are formed have a polysilicon opening 26 formed therein on the sensor 11. The vertical transfer electrodes 24-1 to 24-4 are covered with a light-shielding film 27 made of aluminum. The light-shielding film 27 has a sensor opening 28 formed therein inside the polysilicon opening 26 on the sensor 11. The light-shielding film 27 may be made of a material other than aluminum.

<Wiring Pattern of Vertical Transfer Electrode>

Figure 5A:
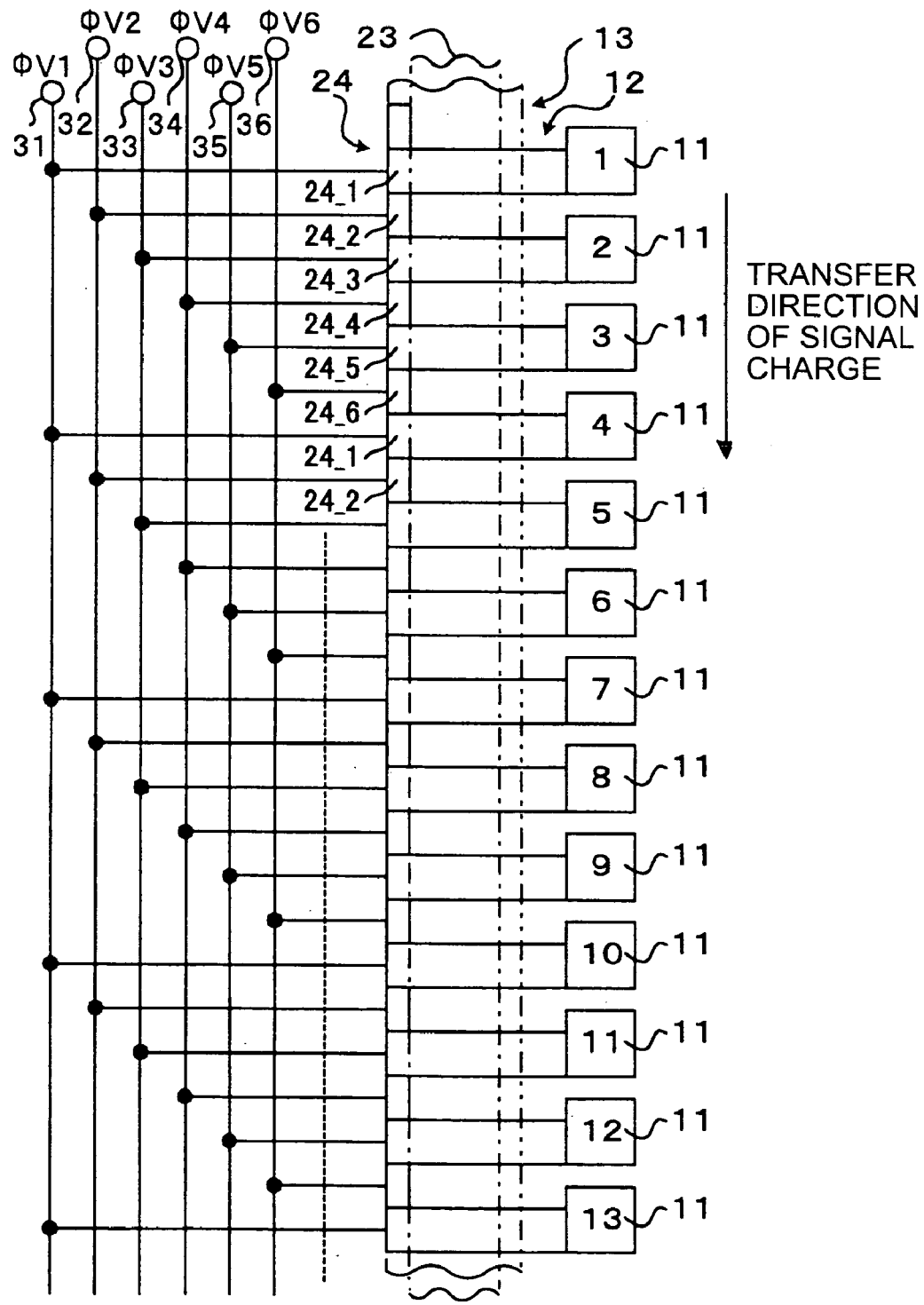
FIGS. 5A and 5B are diagrams showing wiring patterns of transfer electrodes in vertical CCDs.
Figure 5B:
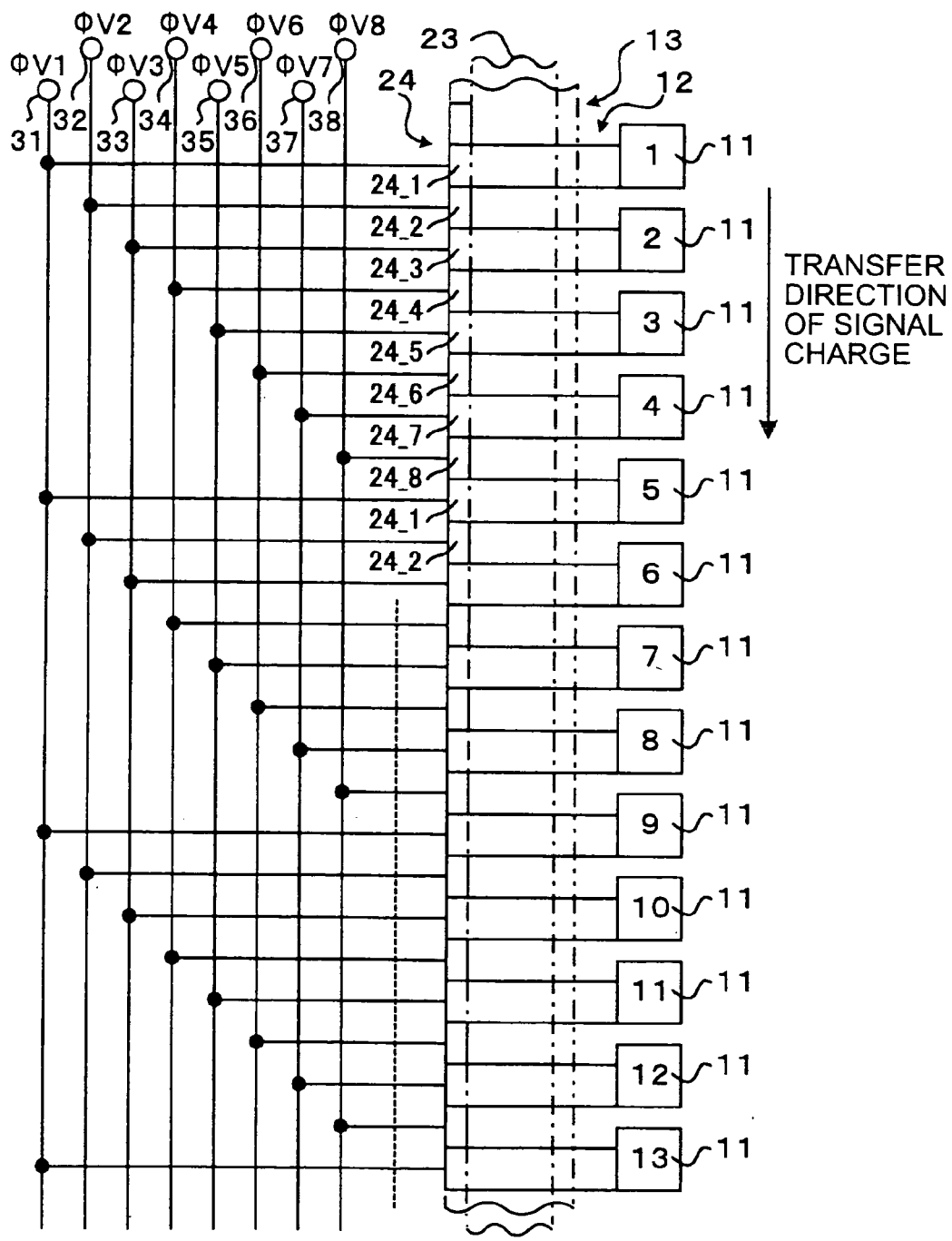

FIGS. 5A and 5B are diagrams showing wiring patterns of the transfer electrodes in the vertical CCDs 13. FIG. 5A shows a wiring pattern in the six-phase drive (24-1 to 24-6) and FIG. 5B shows a wiring pattern in the eight-phase drive (24-1 to 24-8). In these wiring systems, the vertical transfer drive pulses φV1 to φV6 (φV8) for the first to sixth (eighth) phases are supplied, and a total of six (eight) bus lines 31 to 36 (38) are wired for transmitting the vertical transfer clocks.

The vertical transfer electrode 24-1 for the first phase is connected to the bus line 31 for transmitting the vertical transfer drive pulse φV1 for every six (eight) pixels. Similarly, the vertical transfer electrodes 24-2 to 24-6 (24-8) for the second to sixth (eighth) phases are connected to the bus lines 32 to 36 (38) for transmitting the vertical transfer drive pulses φV2 to φV6 (φV8), respectively, for every six (eight) pixels.

Through the transfer channel 23 in the vertical direction in the vertical CCD 13, the drive pulses φV1 to φV6 (φV8) are applied to the vertical transfer electrodes 24-1 to 24-6 (24-8) at a predetermined timing such that the signal charges are sequentially transferred in a direction shown by arrows in FIGS. 5(A) and 5(B).

An example of a manner in which the CCD solid-state imaging device 10 is driven by the timing-signal generator 40, which characterizes this embodiment, will now be described. First, the three-field readout mode will be described.

<Three-Field Readout Mode>

Figure 6:
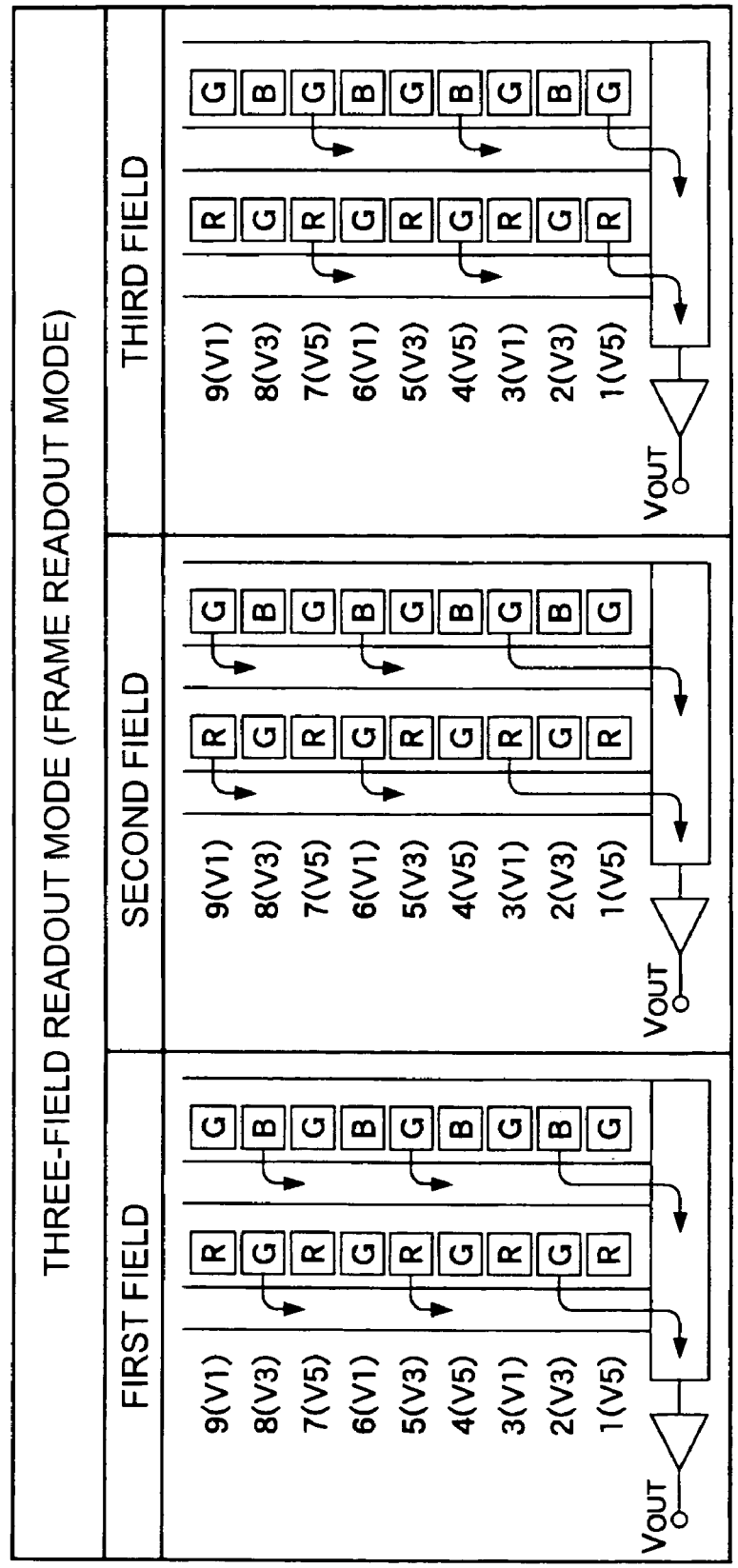
FIG. 6 is a diagram schematically illustrating a three-field readout mode/frame readout mode (an embodiment of the present invention)
Figure 7:
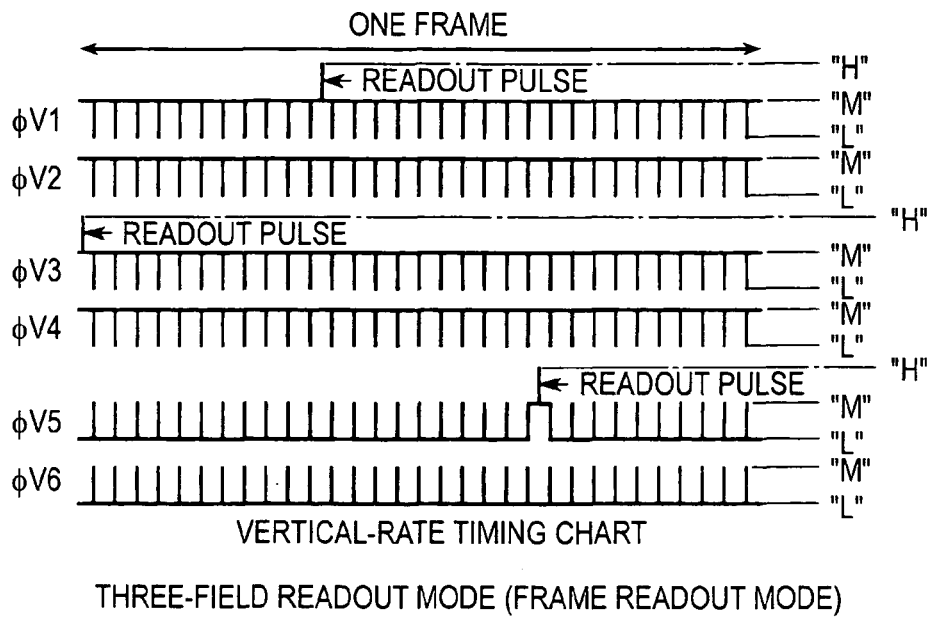
FIG. 7 is a timing chart of vertical transfer drive pulses in the three-field readout mode/frame readout mode (vertical rate; an embodiment of the present invention)
Figure 8:
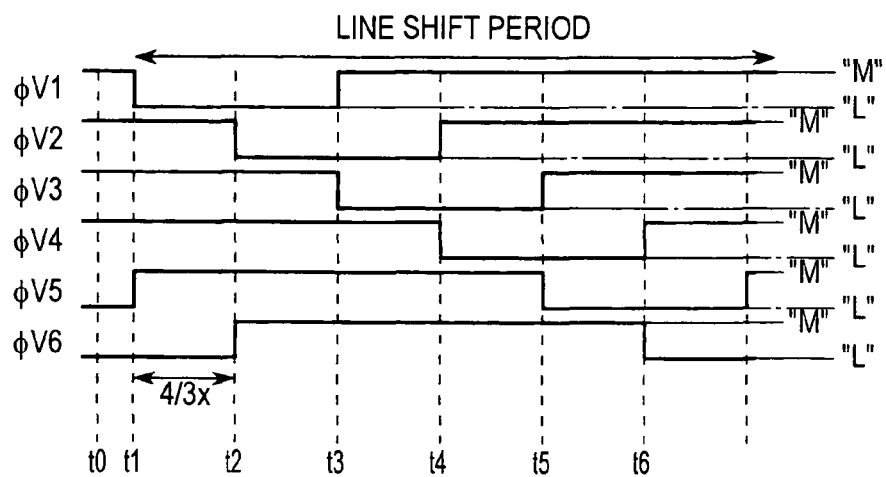
FIG. 8 is a timing chart of the vertical transfer drive pulses in the three-field readout mode/frame readout mode (horizontal rate; an embodiment of the present invention)
Figure 9:
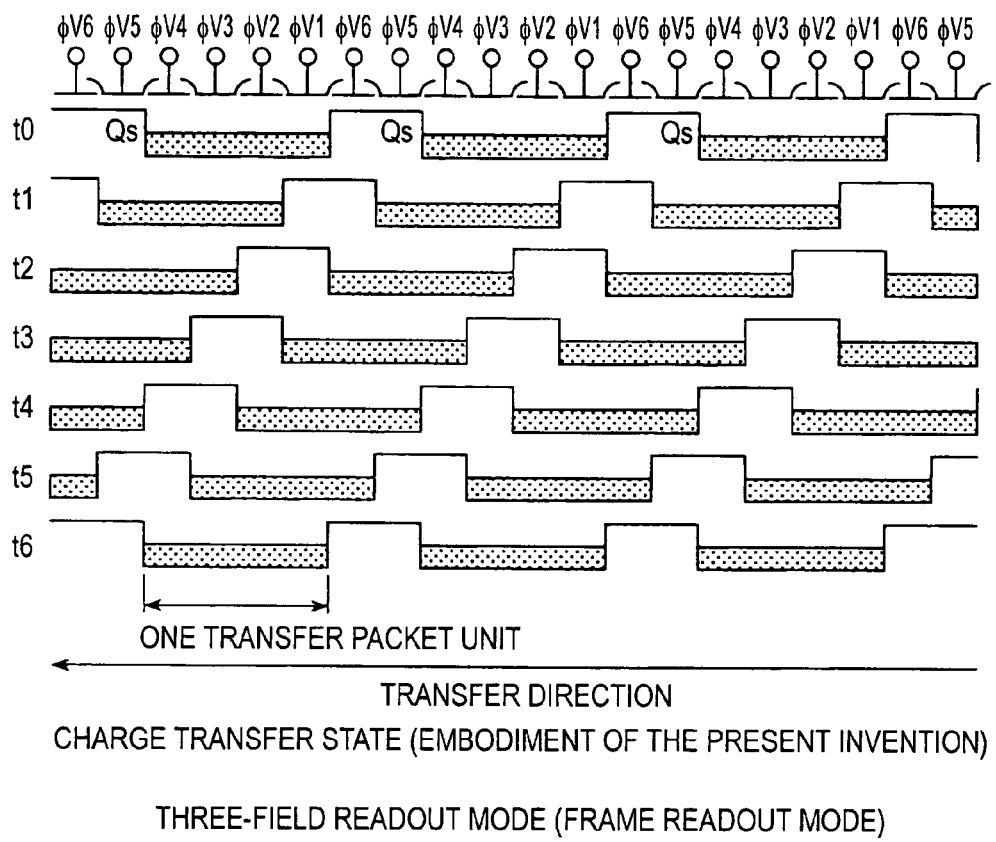
FIG. 9 is a diagram illustrating charge transfer states in the three-field readout mode/frame readout mode (an embodiment of the present invention)

FIGS. 6 to 9 illustrate the operation in the three-field readout mode. FIG. 6 is a schematic view of the operation. FIG. 7 is a timing chart of the vertical transfer drive pulses φV1 to φV6 in the vertical rate. FIG. 8 is a timing chart of the vertical transfer drive pulses φV1 to φV6 for illustrating the operation of the frame readout mode in the three-field readout mode. FIG. 9 is a diagram showing charge transfer states.

Referring to FIG. 6, squares shown by a letter R, G, or B (the color of each color separation filter) in each field represent pixels. Line numbers in the vertical direction are shown at the left side of the pixels with the vertical CCDs 13 sandwiched therebetween (line number 1 is at the side of the lower horizontal CCD), and readout pulses for the respective lines are shown in parentheses. The lines to be read out are shown by arrows drawn from the pixels shown by the squares to the vertical CCDs 13.

Figure 16:
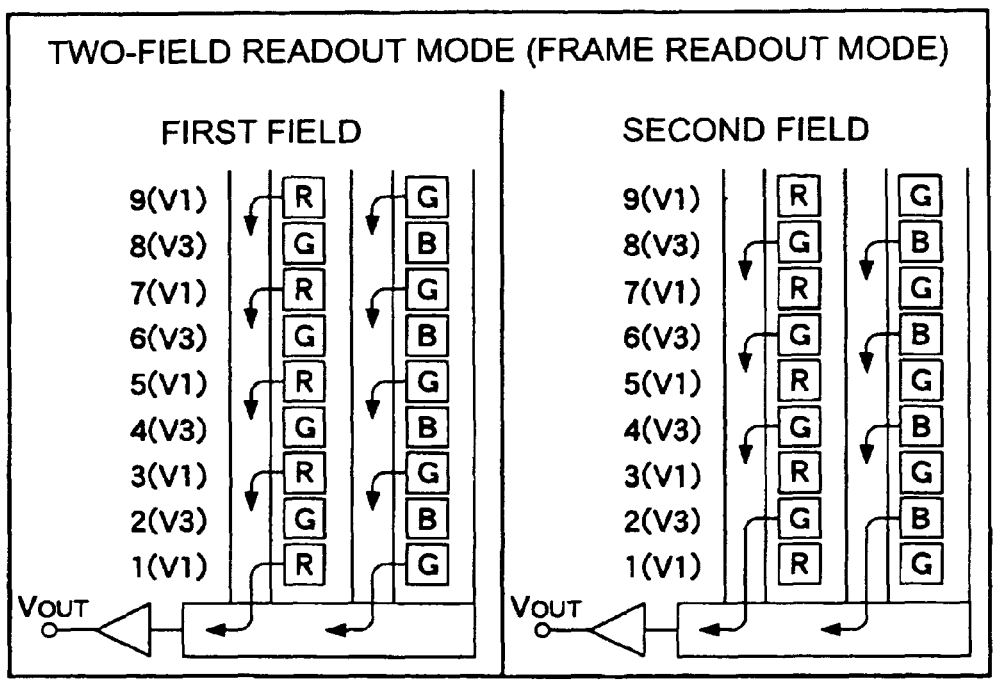
FIG. 16 is a diagram schematically illustrating a two-field readout mode/frame readout mode.
Figure 17:
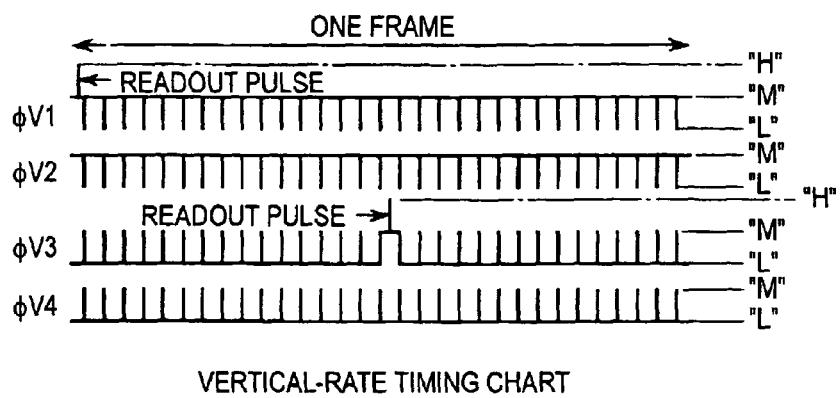
FIG. 17 is a timing chart of the vertical transfer drive pulses in the two-field readout mode/frame readout mode (vertical rate)
Figure 19:
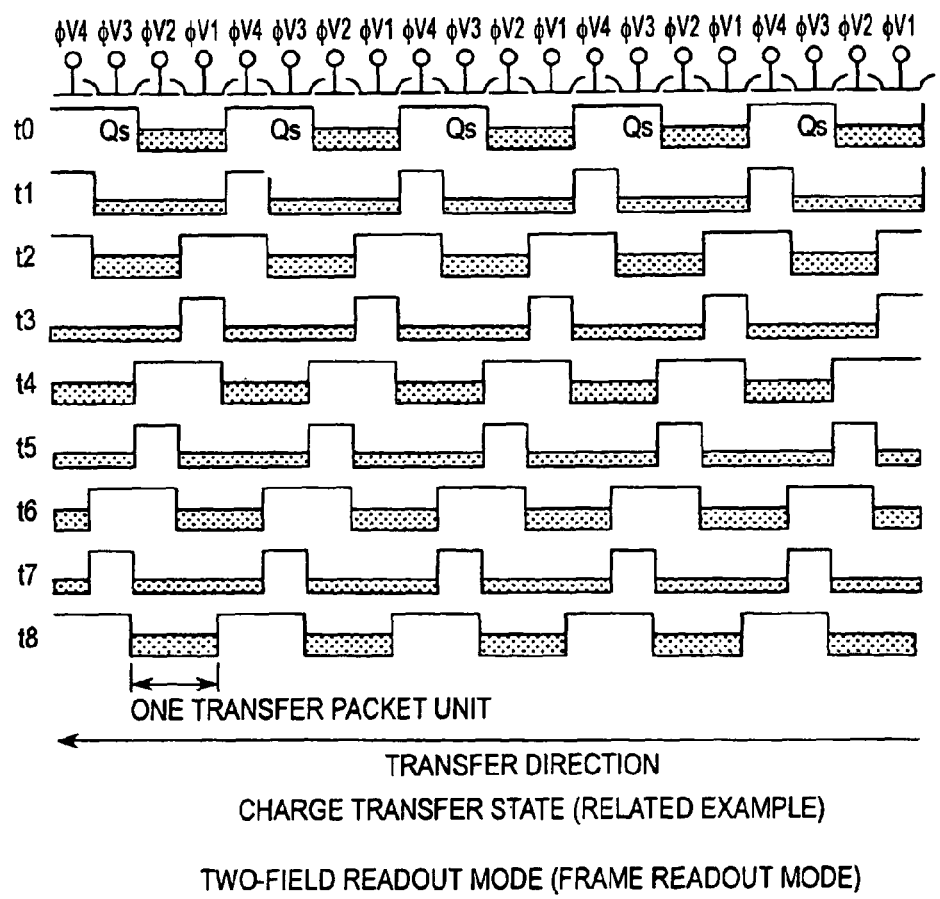
FIG. 19 is a diagram illustrating charge transfer states in the two-field readout mode/frame readout mode (a basic example in a related art)
Figure 20:
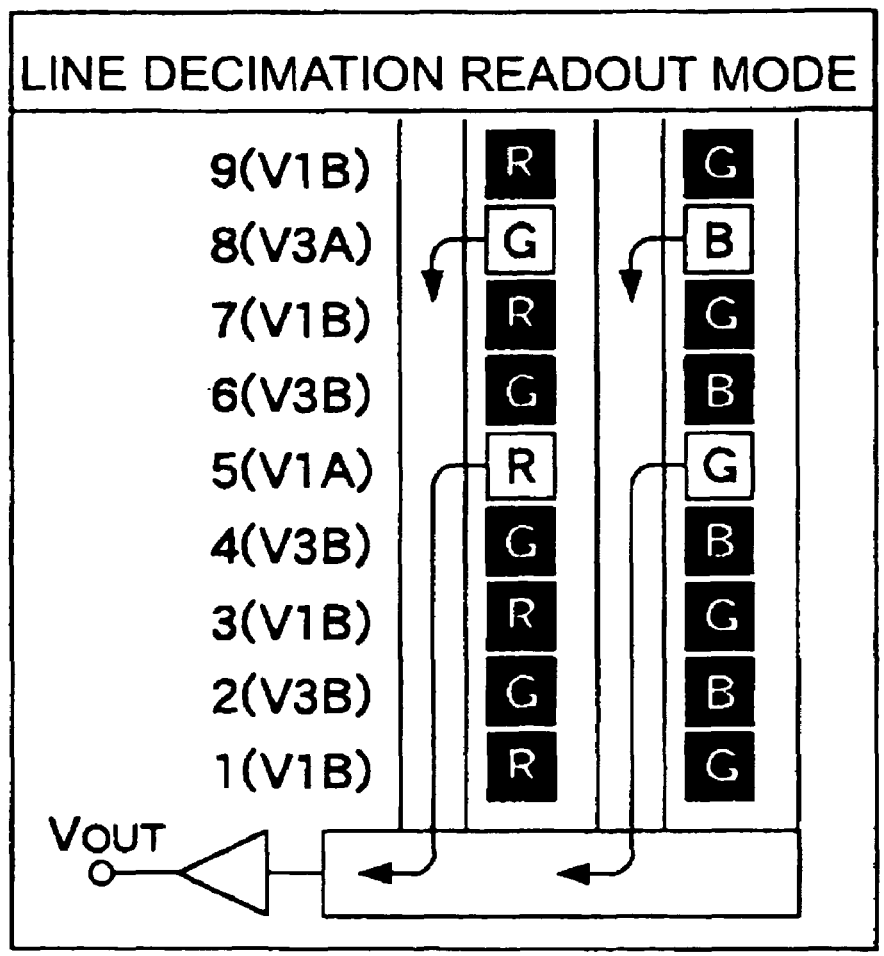
FIG. 20 is a diagram schematically illustrating a two-field readout mode/decimation readout mode (2/8 line)

In two-field readout modes (frame readout modes) in related arts, since one pixel among two pixels in one field is read out, as shown in FIG. 16, a packet of the vertical CCDs (vertical registers) are formed for two pixels (φV1 to φV4), as shown in FIG. 19.

Figure 28:
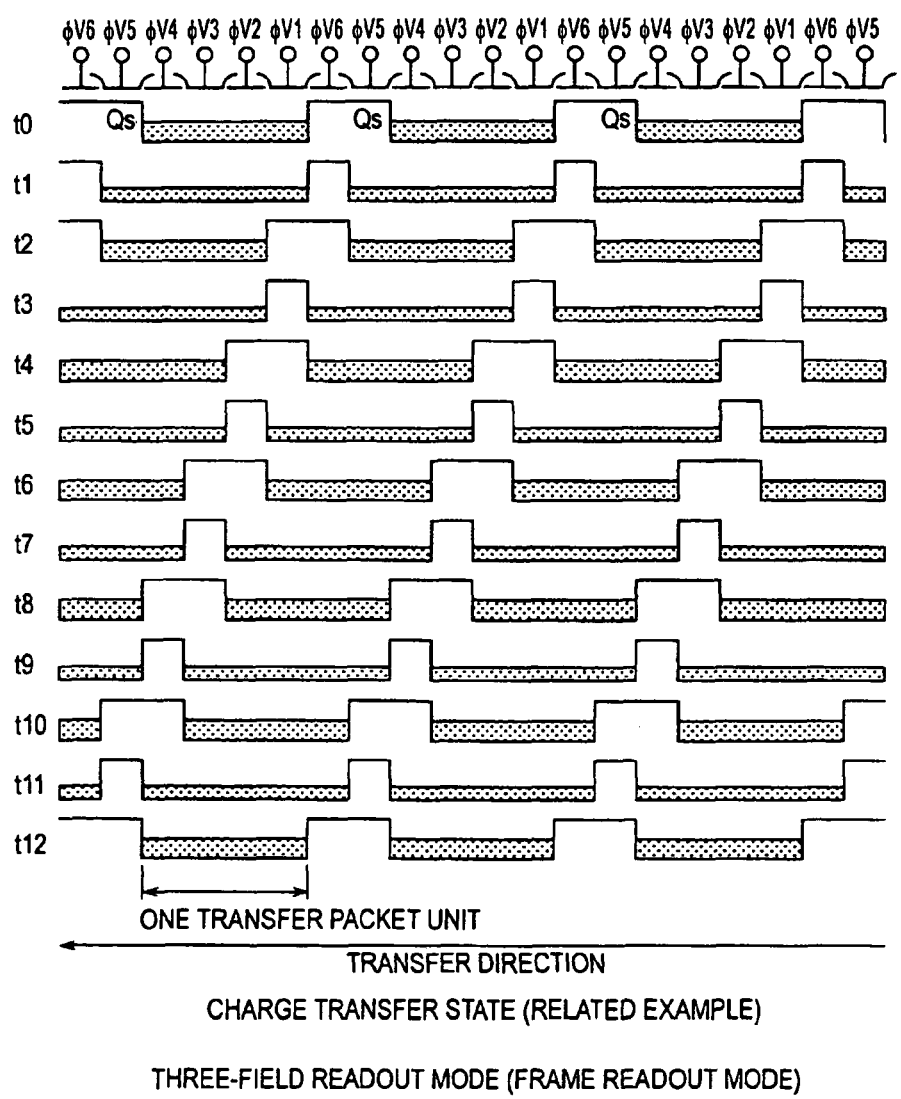
FIG. 28 is a diagram illustrating charge transfer states in the three-field readout mode/frame readout mode (an example in a related art).

In contrast, in the three-field readout mode, since only one pixel among three pixels in one field is read out, as shown in FIG. 6, it is sufficient to form a packet of the vertical CCDs for three pixels (V1 to V6), also shown in FIG. 28. In other words, the signal charges are read from the sensors 11 and are supplied to the vertical CCDs 13 for every three pixels in the vertical direction. Accordingly, while the number of on transfer channels of the vertical CCD is two in the two-field readout mode (frame readout mode), the number of on transfer channels of the vertical CCD is four in the three-field readout mode (frame readout mode), thus increasing the amount of processed charge in the vertical CCDs.

As shown in FIG. 7, the first-phase, the third-phase, and the fifth-phase vertical transfer electrodes 24 in the vertical CCD 13 also serve as the electrodes of the readout gates 12. Hence, among the vertical transfer drive pulses φV1 to φV6 for the six phases, the drive pulses φV1, φV3, and φV5 based on the first-phase, the third-phase, and the fifth-phase transfer clocks V1, V3, and V5 are set so as to have any of three values including a low level (hereinafter referred to as an "L" level), an intermediate level (hereinafter referred to as an "M" level), and a high level (hereinafter referred to as an "H" level). The drive pulse having the third value, that is, the "H" level serves as the drive pulse of the readout gate 12, corresponding to the readout pulse XSG. In this manner, among the vertical transfer drive pulses φV1, φV3, and φV5, the drive pulse having the third "H" level serves as the readout pulse for driving the readout gate 12 when the signal charge is read out from the sensor 11.

In order to define an iteration unit of the three fields, the drive pulse φV1 (φV2) for the first (second) phase differs from the drive pulse φV3 (φV4) for the third (fourth) phase in phase, whereas the drive pulse φV5 (φV6) for the fifth (sixth) phase differs from the drive pulses φV1 to φV4 for the first to fourth phases in the relationship between the L, M, and H levels. In the above description, the drive pulses φV2, φV4, and φV6 shown in parentheses are set so as to have either of two values including the "M" level and the "L" level.

In the frame readout operation mode, as shown in FIG. 6, the readout pulse of the vertical transfer drive pulse φV3 is generated in the first field, the readout pulse of the vertical transfer drive pulse φV1 is generated in the second field, and the readout pulse of the vertical transfer drive pulse φV5 is generated in the third field. In contrast, in a line decimation operation mode, the vertical transfer drive pulses φV1, φV3, and φV5 serve as the readout pulses in the first to third fields.

A readout operation of the signal charge and a vertical transfer operation during the frame readout operation in the three-field readout mode will now be described with reference to FIGS. 8 and 9. Referring to FIG. 9, a direction from right to left is the charge transfer direction.

A driving method according to this embodiment is characterized in that, as shown in FIG. 8, for every charge packet unit in the vertical transfer, a backward transfer channel behind the charge packet in the vertical transfer direction is turned off substantially simultaneously with turning on of a forward transfer channel ahead of the charge packet. For example, one of the transfer channels behind the charge packet to be transferred, that is, the aftermost transfer channel, is turned off substantially simultaneously with turning on of one of the transfer channels ahead of the charge packet to be transferred. A specific description will be followed.

When the signal charge is read out from the sensor 11, in the first field, the vertical transfer drive pulse φV3 shown in FIG. 7 is applied to the third-phase vertical transfer electrode 24-3. Since applying the vertical transfer drive pulse φV3 to the third-phase vertical transfer electrode 24-3 applies the readout pulse to the first-phase readout gate 12, the signal charge is read out from the sensor 11 for every three pixels in the vertical direction and is supplied to the vertical CCD 13.

The readout signal charge is vertically transferred one line at a time during the horizontal blanking period by the transfer operation of the vertical CCD 13. At a time t0 immediately before the line shift period, as shown in FIG. 8, all the drive pulses φV1, φV2, φV3, and φV4 based on the first-phase, second-phase, third-phase, and fourth-phase vertical transfer clocks are in the "M" level. Accordingly, as shown in FIG. 9, the potential below the first-phase, second-phase, third-phase, and fourth-phase vertical transfer electrodes 24-1, 24-2, 24-3, and 24-4 is increased to form one charge packet (transfer packet) unit, and a signal charge Qs is stored in the charge packet.

When a line shift operation is started and the fifth-phase vertical transfer drive pulses φV5 shifts from the "L" level to the "M" level (at a time t1), the potential below the fifth-phase vertical transfer electrode 24-5 is increased. As a result, the signal charge Qs of the charge packet below the first-phase, second-phase, third-phase, and fourth-phase vertical transfer electrodes 24-1, 24-2, 24-3, and 24-4 becomes able to move to the bottom of the fifth-phase vertical transfer electrode 24-5.

In a drive controlling method according to this embodiment, when the time t0 changes to the time t1, the drive pulse φV5 forming the forward transfer channel ahead of the charge packet in the transfer direction is shifted from the "L" to the "M" (from the "L" to "H" as the output from the timing-signal generator 40; the same is hereinafter applied) (the potential of the vertical register is increased and is in a storage state). At the same time, the drive pulse φV1 forming the backward transfer channel behind the charge packet in the transfer direction is shifted from the "M" to "L" (from the "H" to "L" as the output from the timing-signal generator 40; the same is hereinafter applied) (the potential of the vertical register is decreased and is in a state of transferring the signal charge to the subsequent transfer channel).

In this manner, the signal charge Qs of the charge packet, which has been formed below the vertical transfer electrodes 24-1, 24-2, 24-3, and 24-4 at the time t0, is transferred to the charge packet formed below the vertical transfer electrodes 24-2, 24-3, 24-4, and 24-5 at the time t1.

When the sixth-phase vertical transfer drive pulse φV6 shifts from the "L" level to the "M" level (at a time t2), the potential below the sixth-phase vertical transfer electrode 24-6 is increased. As a result, the signal charge Qs of the charge packet below the second-phase, third-phase, fourth-phase, and fifth-phase vertical transfer electrodes 24-2, 24-3, 24-4, and 24-5 becomes able to move to the bottom of the sixth-phase vertical transfer electrode 24-6.

In the drive controlling method according to this embodiment, when the time t1 changes to the time t2, the drive pulse φV6 forming the forward transfer channel ahead of the charge packet in the transfer direction is shifted from the "L" to the "M". At the approximately same time, the drive pulse φV2 forming the backward transfer channel behind the charge packet in the transfer direction is shifted from the "M" to "L".

In this manner, the signal charge Qs of the charge packet, which has been formed below the vertical transfer electrodes 24-2, 24-3, 24-4, and 24-5 at the time t1, is transferred to the charge packet formed below the vertical transfer electrodes 24-3, 24-4, 24-5, and 24-6 at the time t2.

The same operation is subsequently repeated. Specifically, the first-phase vertical transfer drive pulse φV1, which is the forward transfer channel ahead of the charge packet in the transfer direction, shifts from the "L" level to the "M" level (at a time t3). At approximately the same time, the drive pulse φV3 forming the backward transfer channel behind the charge packet in the transfer direction is shifted from the "M" to "L". As a result, the signal charges Qs of the charge packet, which has been formed below the vertical transfer electrodes 24-3, 24-4, 24-5, and 24-6 at the time t2, is transferred to the charge packet formed below the vertical transfer electrodes 24-4, 24-5, 24-6, and 24-1 at the time t3.

The second-phase vertical transfer drive pulse φV2, which is the forward transfer channel ahead of the charge packet in the transfer direction, shifts from the "L" level to the "M" level (at a time t4). At approximately the same time, the drive pulse φV4 forming the backward transfer channel behind the charge packet in the transfer direction is shifted from the "M" to "L". As a result, the signal charge Qs of the charge packet, which has been formed below the vertical transfer electrodes 24-4, 24-5, 24-6, and 24-1 at the time t3, is transferred to the charge packet formed below the vertical transfer electrodes 24-5, 24-6, 24-1, and 24-2 at the time t4.

The third-phase vertical transfer drive pulse φV3, which is the forward transfer channel ahead of the charge packet in the transfer direction, shifts from the "L" level to the "M" level (at a time t5). At approximately the same time, the drive pulse φV5 forming the backward transfer channel behind the charge packet in the transfer direction is shifted from the "M" to "L". As a result, the signal charge Qs of the charge packet, which has been formed below the vertical transfer electrodes 24-5, 24-6, 24-1, and 24-2 at the time t4, is transferred to the charge packet formed below the vertical transfer electrodes 24-6, 24-1, 24-2, and 24-3 at the time t5.

The fourth-phase vertical transfer drive pulse φV4, which is the forward transfer channel ahead of the charge packet in the transfer direction, shifts from the "L" level to the "M" level (at a time t6). At approximately the same time, the drive pulse φV6 forming the backward transfer channel behind the charge packet in the transfer direction is shifted from the "M" to "L". As a result, the signal charge Qs of the charge packet, which has been formed below the vertical transfer electrodes 24-6, 24-1, 24-2, and 24-3 at the time t5, is transferred to the charge packet formed below the vertical transfer electrodes 24-1, 24-2, 24-3, and 24-4 at the time t6.

Through the vertical transfer operation during the above line shift period, the signal charge Qs, which is read out from the sensors 11 and stored in the charge packet below the first-phase to sixth-phase vertical transfer electrodes 24-1 to 24-6, is shifted by one line and is sequentially stored in the charge packets below the subsequent first-phase to sixth-phase vertical transfer electrodes 24-1 to 24-6.

The signal charges corresponding to one line at the bottom of the imaging area 14 are transferred to the horizontal CCD 15. The signal charges corresponding to one line, which have been transferred to the horizontal CCD 15, are horizontally and sequentially transferred by the transfer drive by the horizontal CCD 15 during the horizontal scanning period after the horizontal blanking period.

The first field is exemplified in the above description of the transfer operation. In the second (third) field, applying the vertical transfer drive pulse φV1 (φV5) shown in FIG. 7 to the first-phase (fifth-phase) vertical transfer electrode 24-1 (24-5) applies the readout pulse to the first-phase (fifth-phase) readout gate 12, and the signal charges are read out from the sensors 11 different from those in the first field and are supplied to the vertical CCDs 13 for every pixel in the vertical direction. The subsequent vertical transfer operation is performed in the same manner as in the first field.

Figure 27:
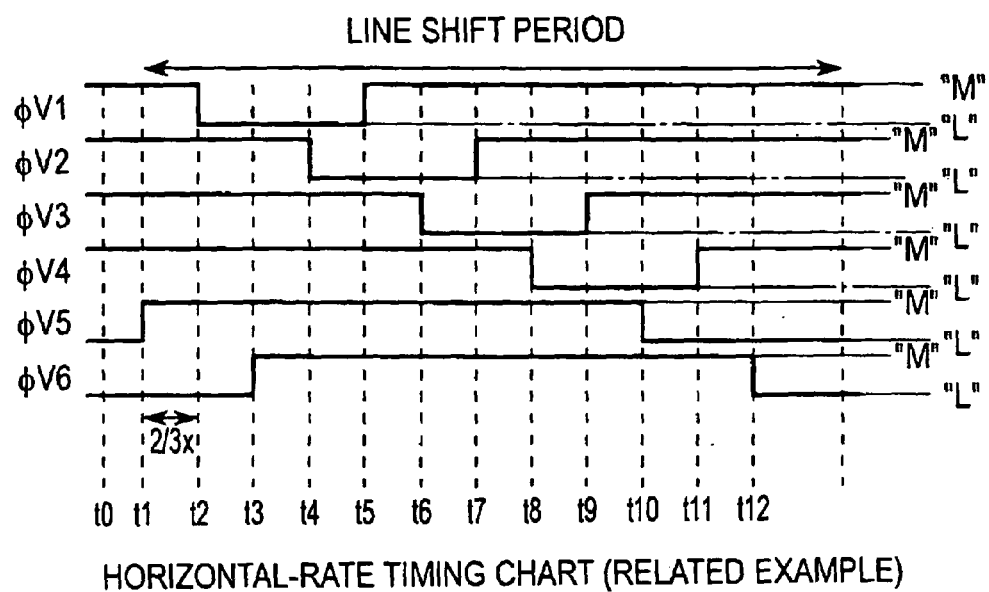
FIG. 27 is a timing chart of the vertical transfer drive pulses in a three-field readout mode/frame readout mode (horizontal rate; an example in a related art)

As described above, turning off the backward transfer channel behind the charge packet in the vertical transfer direction substantially simultaneously with turning on of the forward transfer channel ahead of the charge packet, for every charge packet unit in the vertical transfer, can reduce the vertical transfer period from t0 to t12 in FIG. 27 to the vertical transfer period from t0 to t6 in FIG. 8. In addition, the overlap period of the vertical transfer clocks can be prolonged from "2/3x" in FIG. 27 to "4/3x" in FIG. 8, that is, can be doubled, thus leaving a margin for the propagation delay in the vertical transfer clocks.

Accordingly, at the transfer timing of this embodiment, even in the three-field readout mode for the six-phase drive from V1 to V6, any propagation delay in the vertical transfer clocks (considered physically in the same time base here) does not cause a problem. In addition, it is possible to solve the problem of reduction in the transfer efficiency even in the center of the device or at the opposing side of the input terminal, far from the input terminal of the drive pulse, in the imaging area 14. In other words, in view of one unit of the vertical transfer period (that is, in view of the relative time base), when the vertical transfer pulses having predetermined waveforms are applied from the timing-signal generator 40 to the transfer electrodes of the CCD solid-state imaging device 10 through the driver 42, the waveforms of the drive pulses for driving the transfer electrodes do not become obtuse, unlike the graph shown in FIG. 24A, even in the center of the imaging area 14 or at the opposing side of the input terminal. This implies improvement of the transfer efficiency of the vertical CCDs 13.

Figure 24A:
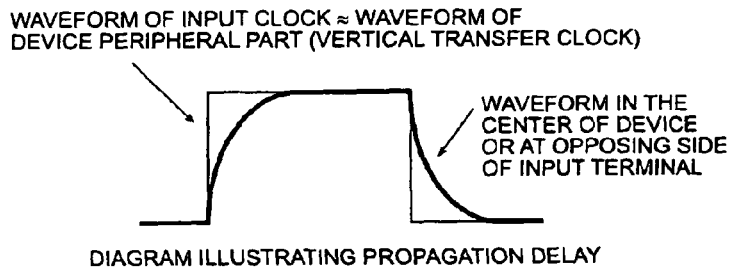
FIGS. 24A to 24C are diagrams illustrating a delay in the vertical transfer drive pulses.
Figure 24B:
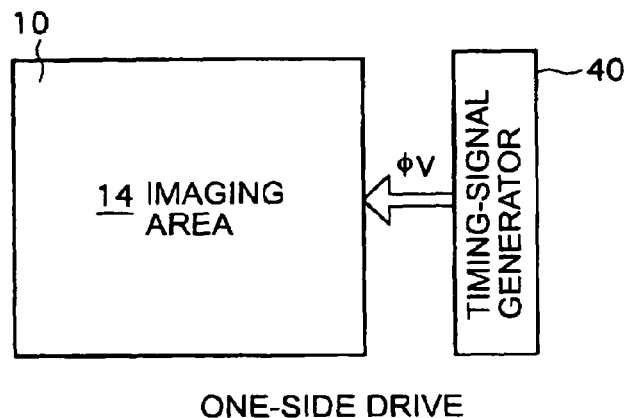
Figure 24C:
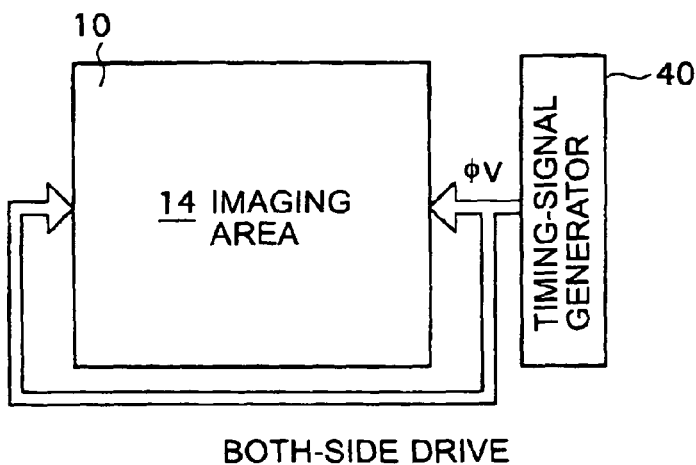
Figure 25:
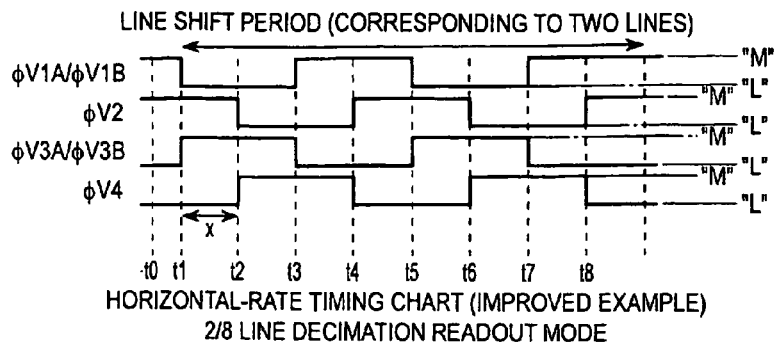
FIG. 25 is a timing chart of the vertical transfer drive pulses in a two-field readout mode/decimation readout mode (2/8 line) (horizontal rate; Patent Document 1)
Figure 26:
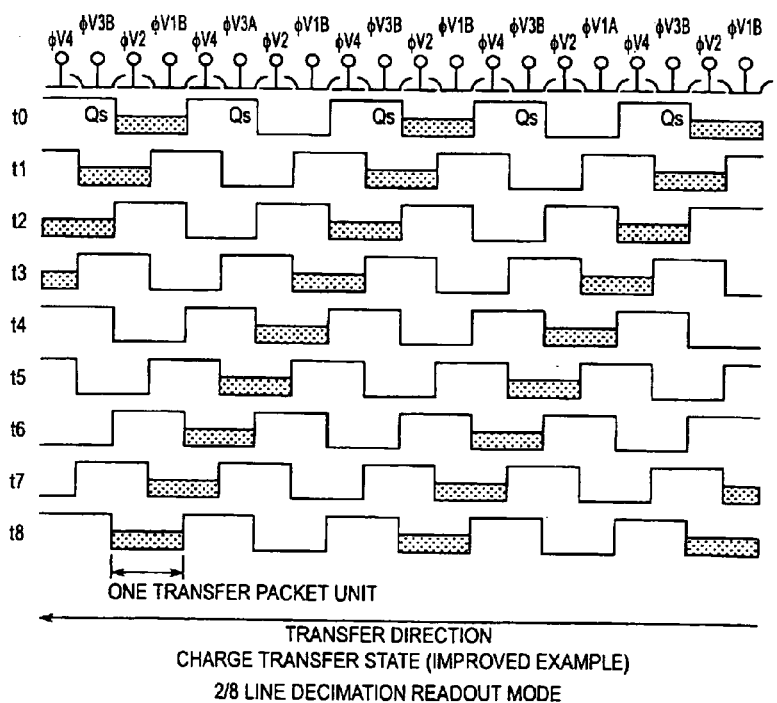
FIG. 26 is a diagram illustrating charge transfer states in the two-field readout mode/decimation readout mode (2/8 line) (Patent Document 1)

For example, at a drive timing in a related art, the overlap period of each clock is short, that is, "$2/3x$". Since the vertical transfer drive pulses φV1 to φV6 are transmitted to the vertical transfer electrodes 24-1 to 24-6 of the vertical CCD 13 through one side or both sides of the imaging area 14, the amplitude of the vertical transfer drive pulses φV1 to φV6 is reduced in the center of the imaging area 14 owing to a wiring resistance or the waveforms of the vertical transfer drive pulses φV1 to φV6 become obtuse owing to the propagation delay caused by the relationship with capacitive components, as shown in FIG. 24A. As a result, the amount of processed charge in the vertical CCDs 13 or the transfer efficiency can be decreased.

In contrast, according to this embodiment, turning off the backward transfer channel behind the charge packet in the vertical transfer direction substantially simultaneously with turning on of the forward transfer channel ahead of the charge packet for every charge packet unit doubles the overlap period of each clock, that is, makes the overlap period of each clock "$4/3x$", compared with the drive timing ("$2/3x$") in a related art. As described in the description of Patent Document 1, a longer overlap period of the vertical transfer clocks is advantageous to the transfer of the signal charges. Accordingly, the drive timing of this embodiment can further improve the transfer efficiency, compared with the drive timing in the related art.

As for the amount of processed charge in the vertical registers, as described above, in the three-field readout mode/frame readout mode having a larger number of on transfer channels of the vertical register, the charge packet in the vertical transfer per one transfer cycle having the six vertical transfer electrodes as one unit can advantageously have a size corresponding to the four vertical transfer electrodes, among the six vertical transfer electrodes. Hence, the amount of processed charge in the vertical registers can be secured, even when the cell size is reduced, at the vertical transfer timing of this embodiment in the three-field readout mode/frame readout mode. This is advantageous to an increase in the resolution (the number of pixels) or a reduction in size.

The driving method in the vertical transfer, in which "the backward transfer channel behind the charge packet in the vertical transfer direction is turned off substantially simultaneously with turning on of the forward transfer channel ahead of the charge packet", is not limited to the frame readout mode described above. This driving method can be applied to the line decimation operation.

Figure 21:
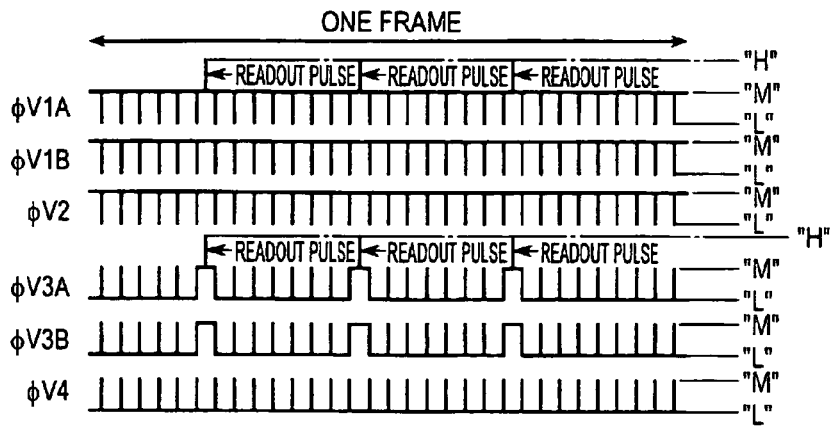
FIG. 21 is a timing chart of the vertical transfer drive pulses in the two-field readout mode/decimation readout mode (2/8 line) (vertical rate)

Specifically, in the three-field readout mode, the vertical transfer drive pulses φV1, φV3, and φV5 serve as readout pulses for driving the readout gates 12 when the pulse having the third-value "H" level reads out the signal charge from the sensor 11, as described above. In the frame readout mode, the fields serving as the readout pulses in the vertical transfer drive pulses φV1, φV3, and φV5 are sequentially switched. In the line decimation mode, as in the two-field readout mode shown in FIG. 21, the first, second, and third fields are divided into two groups. The vertical transfer drive pulses φV1, φV3, and φV5 in the first, second, and third fields in one of the divided two groups serve as the readout pulses, whereas the first, second, and third fields in the other group have no readout pulse.

Furthermore, in the line decimation mode, in order to remove a period having no signal by mixing empty packets that are behind the charge packet including the signal charge Qs and that do not include the signal charge in the horizontal register, the vertical transfer is performed for a predetermined number of lines during horizontal blanking period. However, the basic vertical transfer operation is similar to that in the frame readout mode described above. A case in which the drive timing according to this embodiment is applied to the line decimation operation is not illustrated here.

When the driving method of this embodiment is applied to the line decimation operation, only changing the timing of the driving system in the solid-state imaging device as in cases in related arts and performing the line decimation operation, that is, an operation for capturing higher-speed imaging signals with the number of lines of the imaging signals to be output being decreased, can realize an operation mode in which higher-speed imaging signals, for example, output signals in accordance with a National Television System Committee (NTSC) method are captured, without increasing the data rate. Since such a high-speed readout operation can be realized without depending on a method for increasing a horizontal drive frequency, other problems including a decrease in the transfer efficiency of the horizontal register or an increase in the power consumption of the horizontal register are not caused. In addition, applying the vertical drive timing similar to that in the frame readout mode according to this embodiment allows higher-speed imaging signals to be captured and can improve the transfer efficiency. Accordingly, high-speed imaging signals can be captured when captured images are displayed on an ordinary television monitor or in automatic control including automatic focus control, automatic iris control, or automatic white balance control, so that it is possible to smoothly display motion pictures or to realize accurate automatic control.

As described above, the driving method in the vertical transfer, in which "the backward transfer channel behind the charge packet in the vertical transfer direction is turned off substantially simultaneously with turning on of the forward transfer channel ahead of the charge packet", is not limited to the frame readout mode and can also be applied to the line decimation operation. Hence, this driving method, is versatile.

<Four-Field Readout Mode>

The four-field readout mode under the driving control of the timing-signal generator 40 will now be described.

Figure 10:
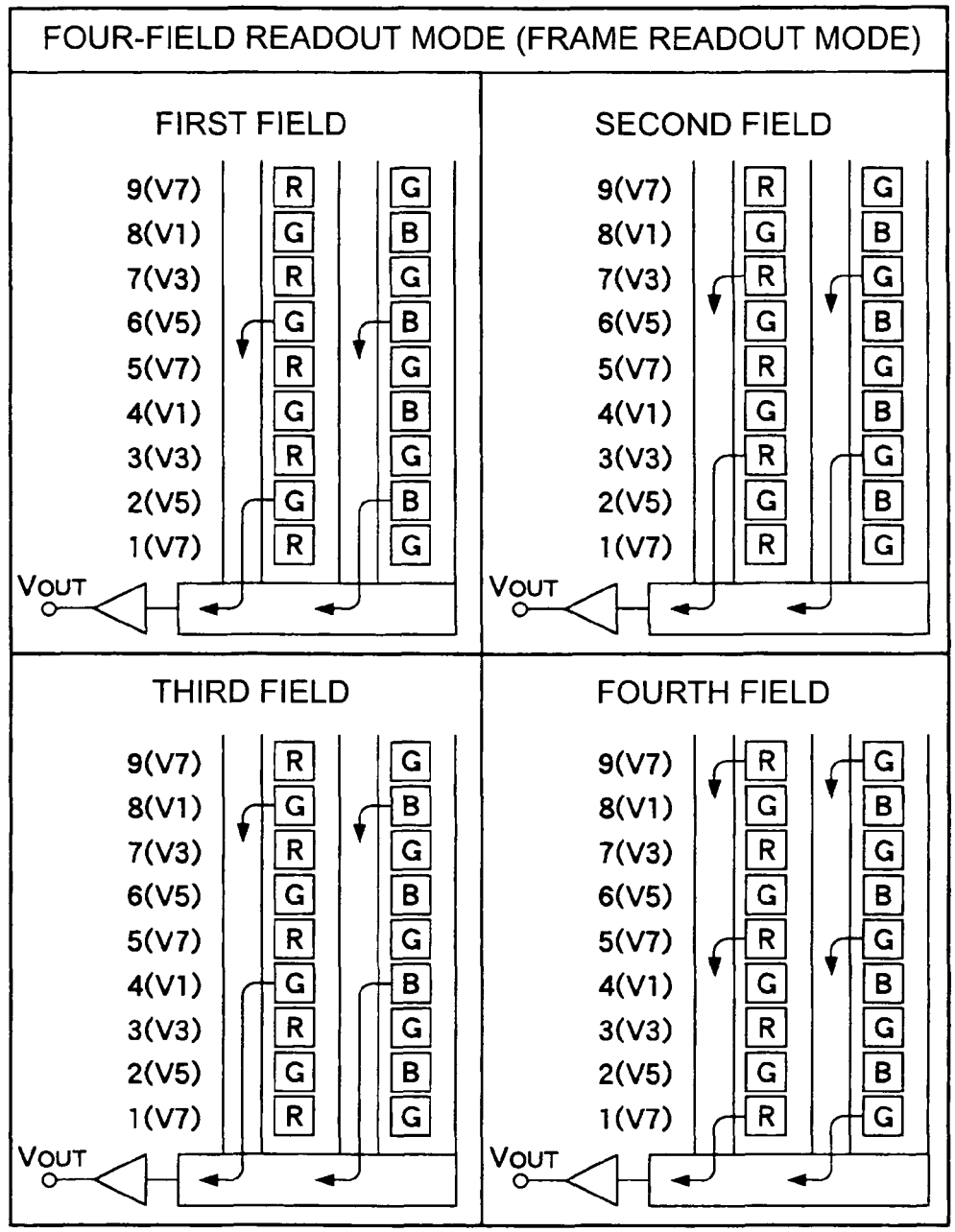
FIG. 10 is a diagram schematically illustrating a four-field readout mode/frame readout mode (an embodiment of the present invention)
Figure 11:
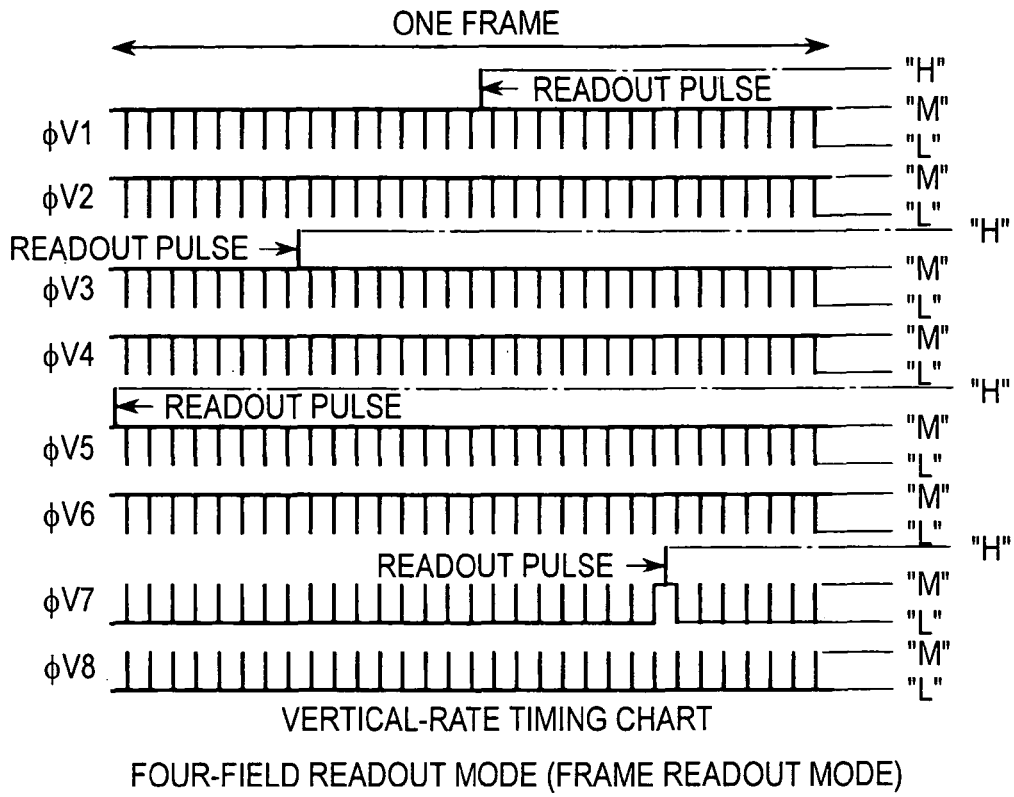
FIG. 11 is a timing chart of the vertical transfer drive pulses in the four-field readout mode/frame readout mode (vertical rate; an embodiment of the present invention)
Figure 12:
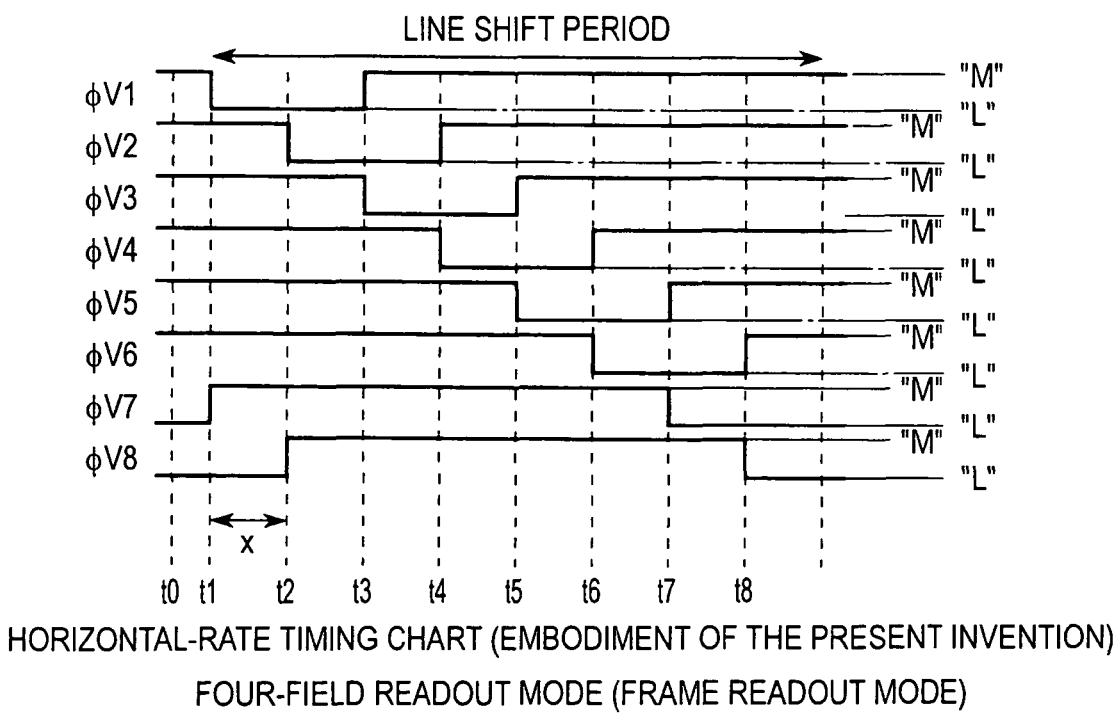
FIG. 12 is a timing chart of the vertical transfer drive pulses in the four-field readout mode/frame readout mode (horizontal rate; an embodiment of the present invention)
Figure 13:
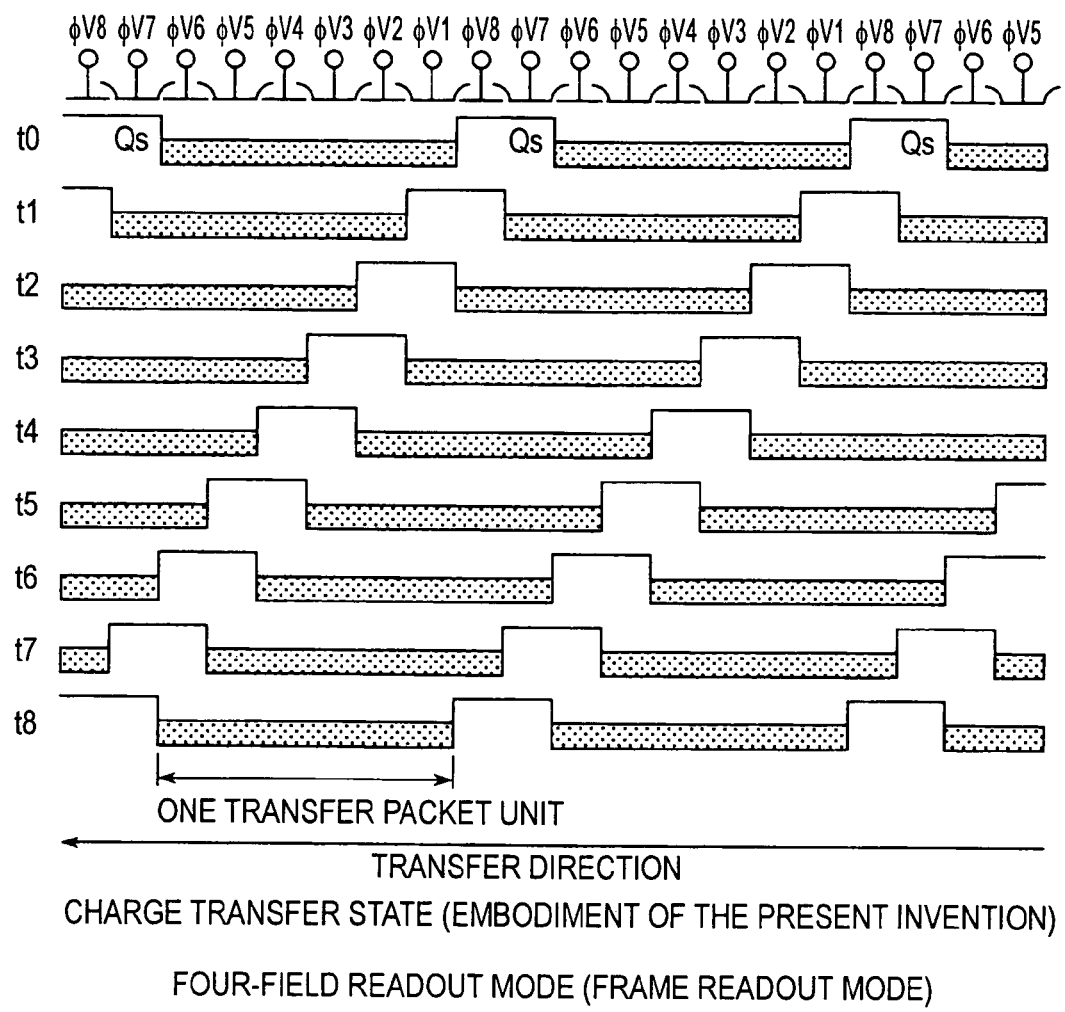
FIG. 13 is a diagram illustrating charge transfer states in the four-field readout mode/frame readout mode (an embodiment of the present invention)

FIGS. 10 to 13 illustrate the operation in the four-field readout mode. FIG. 10 is a schematic view of the operation. FIG. 11 is a timing chart of the vertical transfer drive pulses φV1 to φV8 in the vertical rate. FIG. 12 is a timing chart of the vertical transfer drive pulses φV1 to φV8 for illustrating the operation of the frame readout mode in the four-field readout mode. FIG. 13 is a diagram showing charge transfer states. FIGS. 10 to 13 are shown in the same manner as in the three-field readout mode.

As apparent from comparison with the three-field readout mode, in the four-field readout mode, since only one pixel among four pixels in one field is read out, it is sufficient to form a packet of the vertical CCDs for four pixels (V1 to V8). In other words, the signal charges are read from the sensors 11 and are supplied to the vertical CCDs 13 for every four pixels in the vertical direction. Accordingly, the number of on transfer channels of the vertical CCD is six in the four-field readout mode (frame readout mode), thus further increasing the amount of processed charge in the vertical CCDs, compared with the three-field readout mode (frame readout mode).

As shown in FIG. 11, the first-phase, the third-phase, the fifth-phase, and the seventh-phase vertical transfer electrodes 24 in the vertical CCD 13 also serve as the electrodes of the readout gates 12. Hence, among the vertical transfer drive pulses φV1 to φV8 for the eight phases, the drive pulses φV1, φV3, φV5, and φV7 based on the first-phase, the third-phase, the fifth-phase, and the seventh-phase transfer clocks V1, V3, V5, and V7 are set so as to have any of three values including the low level (hereinafter referred to as the "L" level), the intermediate level (hereinafter referred to as the "M" level), and the high level (hereinafter referred to as the 'H1' level). The drive pulse having the third value, that is, the "H" level serves as the drive pulse of the readout gate 12, corresponding to the readout pulse XSG.

In order to define an iteration unit of the four fields, the drive pulses φV1, φV3, and φV5 for the first, third, and fifth phases differ from each other in phase, whereas the drive pulse φV7 for the last seventh phase differs from the drive pulses φV1, φV3, and the φV5 for the first, third, and fifth phases in the relationship between the L, M, and H levels. The remaining drive pulses φV2, φV4, φV6, and φV8 in the respective pairs are set so as to have either of the two values including the "M" level and the "L" level.

As described above, the vertical transfer drive pulses φV1, φV3, φV5, and φV7 serve as the readout pulses for driving the readout gates 12 when the signal charge is read out from the sensor 11 in response to the pulse having the third-value "H" level. In the frame readout operation mode, as shown in FIG. 10, the readout pulse of the vertical transfer drive pulse φV5 is generated in the first field, the readout pulse of the vertical transfer drive pulse φV3 is generated in the second field, the readout pulse of the vertical transfer drive pulse φV1 is generated in the third field, and the readout pulse of the vertical transfer drive pulse φV7 is generated in the fourth field. In the line decimation operation mode, the vertical transfer drive pulses φV1, φV3, φV5, and φV7 serve as the readout pulses in the first to fourth fields.

A readout operation of the signal charge and a vertical transfer operation during the frame readout operation in the four-field readout mode will now be described with reference to FIGS. 12 and 13. Referring to FIG. 13, a direction from right to left is the charge transfer direction.

Also in the four-field readout mode, a driving method according to this embodiment is characterized in that, as shown in FIG. 12, for every charge packet unit in the vertical transfer, the backward transfer channel behind the charge packet in the vertical transfer direction is turned off substantially simultaneously with turning on of the forward transfer channel ahead of the charge packet. A specific description will be followed.

When the signal charge is read out from the sensor 11, in the first field, the vertical transfer drive pulse φV5 shown in FIG. 11 is applied to the fifth-phase vertical transfer electrode 24-5. Since applying the vertical transfer drive pulse φV5 to the third-phase vertical transfer electrode 24-5 applies the readout pulse to the fifth-phase readout gate 12, the signal charge is read out from the sensor 11 for every four pixels in the vertical direction and is supplied to the vertical CCD 13.

The readout signal charge is vertically transferred one line at a time during the horizontal blanking period by the transfer operation of the vertical CCD 13. At a time t0 immediately before the line shift period, as shown in FIG. 12, all the drive pulses φV1 to φV6 based on the first-phase to sixth-phase vertical transfer pulses are in the "M" level. Accordingly, as shown in FIG. 13, the potential below the first-phase to sixth-phase vertical transfer electrodes 24-1 to 24-6 is increased to form one charge packet (transfer packet) unit, and a signal charge Qs is stored in the charge packet.

When the line shift operation is started and the seventh-phase vertical transfer drive pulses φV7 shifts from the "L" level to the "M" level (at a time t1), the potential below the seventh-phase vertical transfer electrode 24-7 is increased. As a result, the signal charge Qs of the charge packet below the first-phase to sixth-phase vertical transfer electrodes 24-1 to 24-6 becomes able to move to the bottom of the seventh-phase vertical transfer electrode 24-7.

In a drive controlling method according to this embodiment, when the time t0 changes to the time t1, the drive pulse φV7 forming the forward transfer channel ahead of the charge packet in the transfer direction is shifted from the "L" to the "M" (from the "L" to "H" as the output from the timing-signal generator 40; the same is hereinafter applied) (the potential of the vertical register is increased and is in a storage state). At the same time, the drive pulse φV1 forming the backward transfer channel behind the charge packet in the transfer direction is shifted from the "M" to "L" (from the "H" to "L" as the output from the timing-signal generator 40; the same is hereinafter applied) (the potential of the vertical register is decreased and is in a state of transferring the signal charge to the subsequent transfer channel).

In this manner, the signal charge Qs of the charge packet, which has been formed below the vertical transfer electrodes 24-1 to 24-6 at the time t0, is transferred to the charge packet formed below the vertical transfer electrodes 24-2 to 24-7 at the time t1. The size of the charge packet during the transfer operation substantially coincides with the original size thereof.

As in the three-field readout mode, the same operation as in the shift from t0 to t1 is subsequently repeated. The signal charge, which has been stored in the transfer channel formed below the vertical transfer electrodes 24-2 to 24-7 at time t1, is sequentially transferred to the bottom of the vertical transfer electrodes 24-3 to 24-8 in the shift from t1 to t2, to the bottom of the vertical transfer electrodes 24-4 to 24-1 in the shift from t2 to t3, to the bottom of the vertical transfer electrodes 24-5 to 24-2 in the shift from t3 to t4, to the bottom of the vertical transfer electrodes 24-6 to 24-3 in the shift from t4 to t5, to the bottom of the vertical transfer electrodes 24-7 to 24-4 in the shift from t5 to t6, to the bottom of the vertical transfer electrodes 24-8 to 24-5 in the shift from t6 to t7, and to the bottom of the vertical transfer electrodes 24-1 to 24-6 in the shift from t7 to t8.

Through the vertical transfer operation during the above line shift period, the signal charge Qs, which is read out from the sensors 11 and stored in the charge packet below the first-phase to eighth-phase vertical transfer electrodes 24-1 to 24-8, is shifted by one line and is sequentially stored in the charge packets below the subsequent first-phase to eighth-phase vertical transfer electrodes 24-1 to 24-8. The signal charges corresponding to one line at the bottom of the imaging area 14 are transferred to the horizontal CCD 15. The signal charges corresponding to one line, which have been transferred to the horizontal CCD 15, are horizontally and sequentially transferred by the transfer drive by the horizontal CCD 15 during the horizontal scanning period after the horizontal blanking period.

The first field is exemplified in the above description of the transfer operation. In the second (third or fourth) field, applying the vertical transfer drive pulse φV3 (φV1 or φV7) shown in FIG. 11 to the third-phase (first-phase or seventh-phase) vertical transfer electrode 24-3 (24-1 or 24-7) applies the readout pulse to the third-phase (first-phase or seventh-phase)

readout gate 12, and the signal charges are read out from the sensors 11 different from those in the first field and are supplied to the vertical CCDs 13 for every pixel in the vertical direction. The subsequent vertical transfer operation is performed in the same manner as in the first field.

As described above, also in the four-field readout mode, turning off the backward transfer channel behind the charge packet in the vertical transfer direction substantially simultaneously with turning on of the forward transfer channel ahead of the charge packet, for every charge packet unit in the vertical transfer, provides the vertical transfer period from t0 to t8 in FIG. 12. In addition, the overlap period of the vertical transfer clocks can be set to x (=4/4x), as shown in FIG. 12. Although not illustrated here, at a transfer timing for the eight-phase drive in a related art, a period from t0 to t16 is required and the overlap period of the vertical transfer clocks is set to "1/4x". Accordingly, at the transfer timing according to this embodiment, the overlap period can be prolonged, compared with cases in related arts, thus leaving a margin for the propagation delay in the vertical transfer clocks.

Hence, turning off the backward transfer channel behind the charge packet in the vertical transfer direction substantially simultaneously with turning on of the forward transfer channel ahead of the charge packet, for every charge packet unit in the vertical transfer, makes it difficult to cause a propagation delay in the vertical transfer clocks also in the four-field readout mode for the eight-phase drive from V1 to V8. The waveforms of the drive pulses for driving the transfer electrodes do not become obtuse, unlike the graph shown in FIG. 24A, even in the center of the imaging area 14, thus improving the transfer efficiency of the vertical CCDs 13.

As in the three-field readout mode, the timing in the vertical transfer drive described above is not limited to the frame readout mode described above. The timing can also be applied to the line decimation operation.

As described above, the number of on transfer channels of the vertical CCD is six in the four-field readout mode (frame readout mode). The amount of processed charge in the vertical CCDs can be further increased, compared with the three-field readout mode (frame readout mode), thus having the advantage of reducing the cell size. The four-field readout mode is more suitable for a CCD solid-state imaging device that is reduced in size or has a larger number of pixels.

In the above description of the frame readout operation in the three-field readout mode or the four-field readout mode, "substantially simultaneously with" in the phrase "turning off the backward transfer channel behind the charge packet in the vertical transfer direction substantially simultaneously with turning on of the forward transfer channel ahead of the charge packet" does not necessarily and strictly mean "simultaneously with" as long as being used for the same purpose. For example, it wouldn't matter if a slight delay occurs between clocks. It is sufficient to leave a margin for improving the transfer efficiency of the vertical CCDs 13 that is decreased owing to a propagation delay of the vertical transfer clocks. The relationship between a delay in the drive pulse and the amount of processed charge in the vertical CCDs will now be described.

<Relationship Between Delay in Drive Pulse and Amount of Processed Charge>

FIGS. 14A to 14D are diagrams illustrating the relationship of the amount of processed charge in the vertical CCDs with respect to a delay in the drive pulse. Although the three-field readout mode and frame readout operation is exemplified here, the same applies to the four-field readout mode and frame readout operation or the decimation readout operation.

Figure 14A:
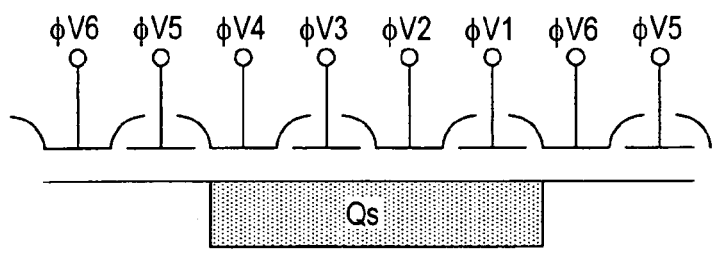
FIGS. 14A to 14D are diagrams illustrating the relationship of the amount of processed charge in the vertical CCDs with respect to a delay in the drive pulses.

As described with reference to FIG. 9, at time to, the signal charge Qs is stored in the charge packet formed below the vertical transfer electrodes 24-1, 24-2, 24-3, and 24-4. This state is shown in FIG. 14A.

Figure 14B:
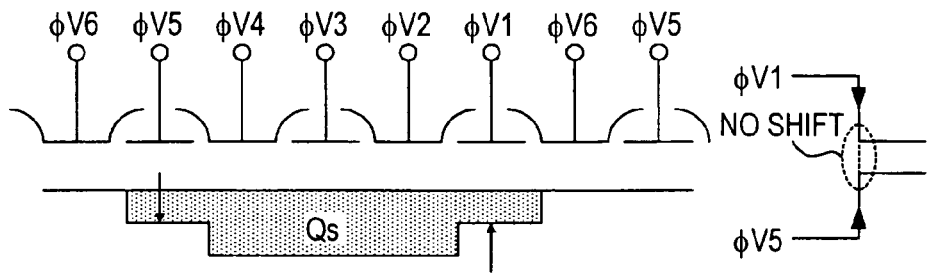

Subsequently to this state, since the backward transfer channel behind the charge packet in the vertical transfer direction is turned off "substantially simultaneously with" turning on of the forward transfer channel ahead of the charge packet according to this embodiment, the potentials on both sides of the charge packet storing the signal charge Qs are simultaneously moved. For example, in the charge transfer process from t0 to t1, a charge well is formed below the vertical transfer electrode 24-5 and the charge well below the vertical transfer electrode 24-1 disappears. Accordingly, unless there is a difference, such as a slight delay, between clocks, a state in which the depth of the existing charge well below the vertical transfer electrode 24-1 is reduced simultaneously with the start of the formation of the charge well below the vertical transfer electrode 24-5 temporarily occurs, as shown in FIG. 14B. In this case, although the amount of processed charge (the amount of stored charge) is not logically varied, it tends to slightly decrease if there is any delay in timing.

Figure 14C:
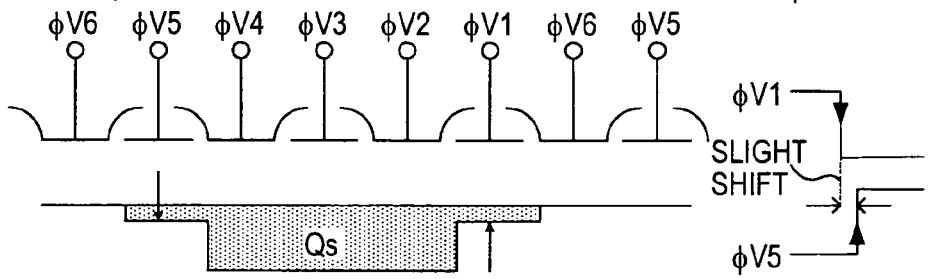

If the shift of the drive pulse φV1 from the "H" level to the "L" level (the potential of the vertical register is decreased and is in the state of transferring the signal charge to the subsequent transfer channel) occurs slightly earlier than the shift of the drive pulse φV5 from the "L" level to the "M" level (the potential of the vertical register is increased and is in the storage state), a state in which the charge well starts to be formed below the vertical transfer electrode 24-5 after the depth of the existing charge well below the vertical transfer electrode 24-1 is considerably reduced temporarily occurs, as shown in FIG. 14C. In this case, the amount of processed charge is slightly decreased.

Figure 14D:
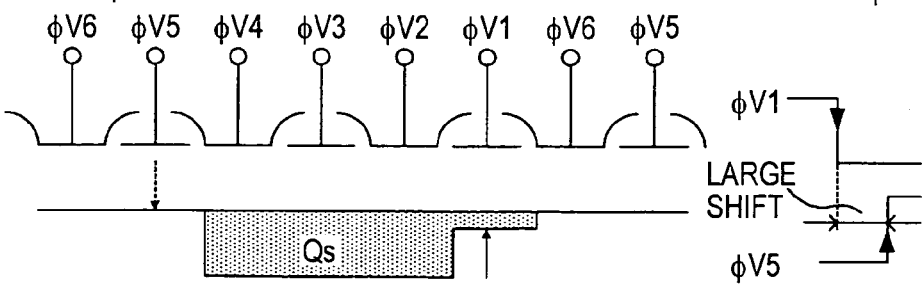

If the shift of the drive pulse φV1 from the "H" level to the "L" level occurs considerably earlier than the shift of the drive pulse φV5 from the "L" level to the "M" level, a state in which the charge well starts to be formed below the vertical transfer electrode 24-5 after the existing charge well below the vertical transfer electrode 24-1 completely disappears occurs, as shown in FIG. 14D. In this case, the transfer channel below the vertical transfer electrode 24-1 does not contribute to the storage of the signal charge and a state in which the signal charge is stored only in three transfer channels (charge wells) temporarily occurs. Hence, the amount of processed charge in the vertical registers in one transfer channel is decreased.

However, although not shown in the figures, in the line decimation operation, an empty packet B exists behind a packet A including the signal charge Qs. Accordingly, if the signal charge Qs does not overflow the empty packet B while the signal charge Qs overflows the packet A, the overflow does not cause a problem because the signal charges in the packets A and B are finally mixed in the horizontal CCD 15, and the amount of processed charge in the vertical CCDs 13 is not decreased.

Although such a shift in switching timing of the drive pulses does not occur in the transfer clocks V1 to V6 (V8) output from the timing-signal generator 40, a propagation delay occurs through the transfer electrodes, as shown in FIG. 24A, even when the transfer clocks are appropriately applied to the transfer electrodes. Furthermore, since the transfer electrodes do not necessarily have the same amount of delay, an occurrence of a shift in the switching timing in the device is inevitable. Depending on the structure of the timing-signal generator 40, a shift can occur in the transfer clocks V1 to V6 (V8) themselves output from the timing-signal generator 40.

However, even if a shift occurs owing to a propagation delay, as shown in FIG. 24A, or even if a shift occurs in the outputs from the timing-signal generator 40, the shift does not actually cause a problem as long as a differential delay is within an allowable range, as described above.

Although the driving method in the vertical transfer, in which the backward transfer channel behind the charge packet in the vertical transfer direction is turned off substantially simultaneously with turning on of the forward transfer channel ahead of the charge packet, is applied to the three-field readout mode and the four-field readout mode (regardless of the frame readout mode or the decimation readout mode) as examples, the driving method is not limited to the three-field readout mode or the four-field readout mode. Such a driving method can be applied to a more-than-four-field readout mode, for example, to a five-field readout mode for ten-phase drive (φV1 to φV10). It would be easily understood, from the description of the three-field readout mode or the four-field readout mode, that applying such a driving method can prolong the overlap period of the vertical transfer clocks and can improve the transfer efficiency of the vertical registers. Also in the case of the more-than-four-field readout mode, the driving method is not limited to the frame readout mode and can be applied to the decimation readout mode.

The driving method in the vertical transfer, in which the backward transfer channel behind the charge packet in the vertical transfer direction is turned off substantially simultaneously with turning on of the forward transfer channel ahead of the charge packet, is not limited to a three-or-more-field frame readout mode or decimation readout mode and can be applied to the two-field readout mode or decimation readout mode. In this case, in the decimation readout operation, the driving method according to an embodiment of the present invention seems to be similar to the technology disclosed in Patent Document 1. However, the meaning and effect of the driving method is different from those in Patent Document 1. A description of this will be followed.

<Difference in Technique Between this Embodiment and Patent Document 1 in Two-Field Readout Mode>

Figure 22:
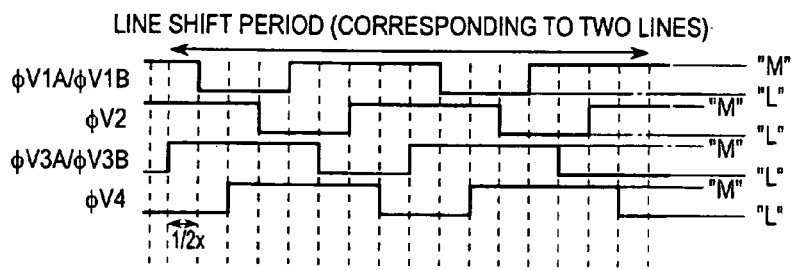
FIG. 22 is a timing chart of the vertical transfer drive pulses in the two-field readout mode/decimation readout mode (2/8 line) (horizontal rate; a basic example in a related art)
Figure 23:
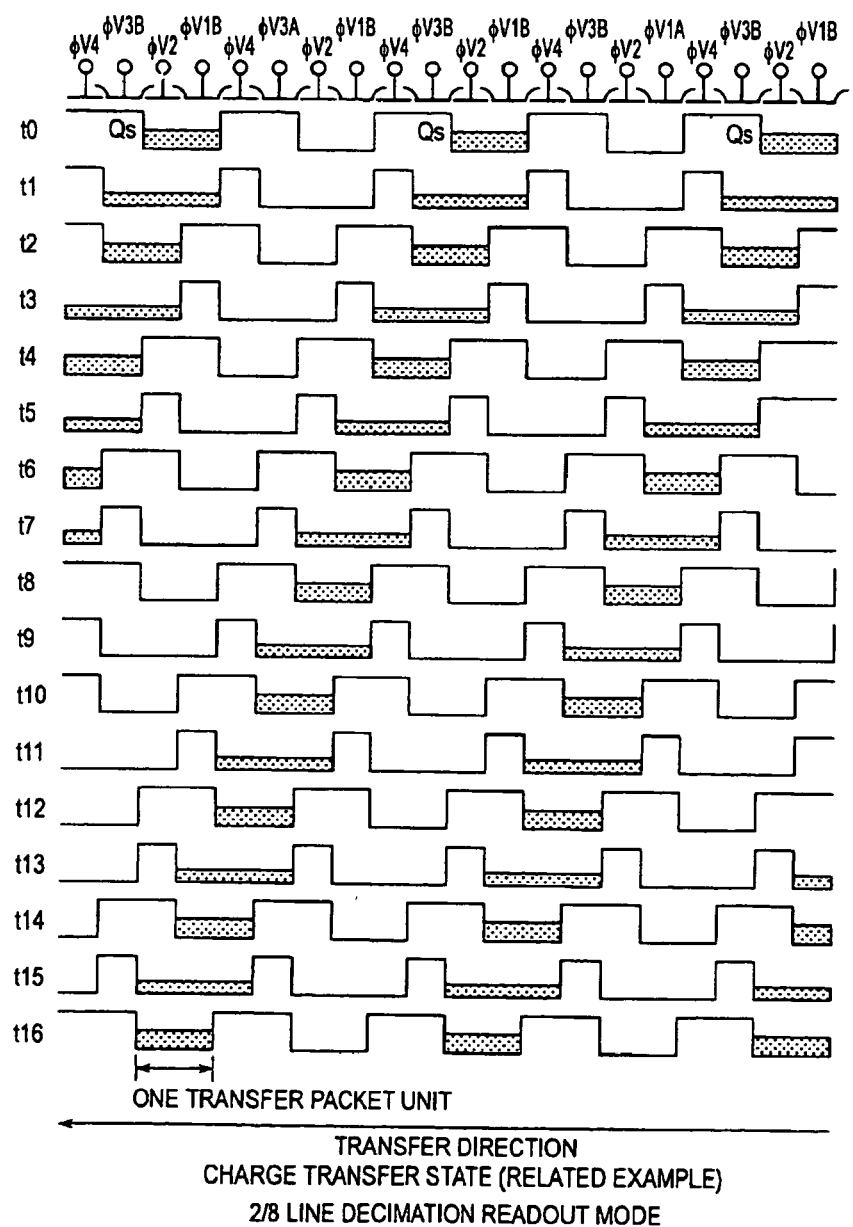
FIG. 23 is a diagram illustrating charge transfer states in the two-field readout mode/decimation readout mode (2/8 line) (a basic example in a related art)

FIGS. 15A to 15D-2 are diagrams illustrating the operation in the two-field readout mode and 2/8 line decimation readout mode. FIG. 15A shows drive timings of the example in a related art (basic form) shown in FIG. 22. FIG. 15B shows drive timings according to this embodiment. FIG. 15C shows drive timings to which a complementary drive according to Patent Document 1 is applied. FIGS. 15D-1 and 15D-2 are enlarged views when the transfer clocks output from the timing-signal generator 40 are switched, for illustrating a difference in technology between this embodiment and Patent Document 1.

Figure 18:
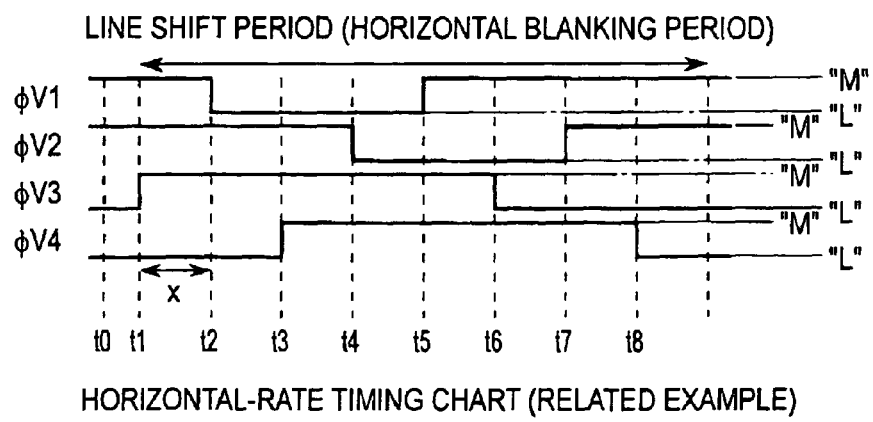
FIG. 18 is a timing chart of the vertical transfer drive pulses in the two-field readout mode/frame readout mode (horizontal rate; a basic example in a related art)

As shown in FIG. 15A, at the basic drive timings in related arts, 16 cycles (t1 to t16) are required for transferring the signal charges corresponding to two lines. When the overlap period of the vertical transfer clocks for transferring the signal charges corresponding to one line in the frame readout operation shown in FIG. 18 is represented by "x", the overlap period of the vertical transfer clocks at the basic drive timing shown in FIG. 15A in an example in a related art is represented by "½x" because the signal charges corresponding to two lines are vertically transferred.

In contrast, at the drive timing according to this embodiment, the backward transfer channel behind the charge packet in the vertical transfer direction is turned off substantially simultaneously with turning on of the forward transfer channel ahead of the charge packet. As shown in FIG. 15B, only eight cycles (t1 to t8) are required for transferring the signal charges corresponding to two lines and, therefore, a high-speed transfer can be achieved. In addition, in the vertical transfer according to this embodiment, the overlap period of the vertical transfer clocks can be prolonged and can be set to "x" as in the basic drive timing in the example in the related art.

The drive timing and the overlap period of the vertical transfer clocks according to this embodiment are approximately the same as in Patent Document 1 shown in FIG. 15C. That is, the drive timing and the overlap period of the vertical transfer clocks according to this embodiment are similar to those in Patent Document 1 in respect of the drive pulse timing. However, the meaning of each technology is completely different.

Specifically, as shown in FIG. 15D-2, in the method, according to Patent Document 1, in which the vertical transfer is performed by using a combination of pairs of vertical transfer clocks having opposite phases (complementary) in the line decimation operation, there is no shift, in principle, in the rising edges and the falling edges (time points t1 to t8 in the figures) between the paired pulses in the transfer clocks V1 to V6 (V8) output from the timing-signal generator 40. This is the reason why the method is represented as "having opposite phases (complementary)". An allowable shift should be, for example, a "difference in gate delay" of logic gates (such as AND gates and OR gate) in the circuit.

In contrast, in the driving method according to this embodiment, as shown in FIG. 15D-1, the backward transfer channel behind the charge packet in the vertical transfer direction is turned off "substantially simultaneously with" turning on of the forward transfer channel ahead of the charge packet. Any shift in the rising edges and the falling edges between the corresponding pulses does not cause a problem, as described above with reference to FIGS. 14A to 14D. A state having no shift is equal to the "opposite phases (complementary)" state in view of the waveforms. An allowable "shift" in the rising edges and the falling edges between the corresponding pulses according to this embodiment is completely different from that in Patent Document 1.

As described above, in the two-field readout mode and line decimation readout mode, although the drive timing and the overlap period of the vertical transfer clocks in the driving method according to this embodiment seem to be similar to those in the driving method according to Patent Document 1, their technical meanings are different. In addition, the driving method in Patent Document 1 has a restriction on the circuit design in that the paired transfer clocks must have "opposite phases (complementary)", whereas the driving method according to this embodiment does not have such a restriction. It is sufficient for the driving method according to this embodiment to have a circuit configuration such that the rising edges arise "substantially simultaneously with" the falling edges in the corresponding pulses, and the driving method according to this embodiment has the advantage of providing a higher flexibility in the circuit design. In consideration of a difference in delay between the transfer electrodes, the transfer pulses output from the timing-signal generator 40 may be positively shifted to balance the entire transfer efficiency.

Although the cases in which the number of phases for driving is an even number are exemplified in the above embodiments, the driving method in which the backward transfer channel behind the charge packet in the vertical transfer direction is turned off substantially simultaneously with turning on of the forward transfer channel ahead of the charge packet can also be applied to cases, in related arts, in which the number of phases for driving is an odd number (for example, three, five, or more), as apparent from the above description. The same effect can be achieved in such cases.

Although the driving method is applied to the CCD solid-state imaging device in the interline transfer mode in the above embodiments, the present invention is not limited to the device in the interline transfer mode. The present invention can be applied to a CCD solid-state imaging device in a mode other than the interline transfer mode or a solid-state imaging device using a device other than the CCD.

As described above, according to the embodiments of the present invention, the vertical transfer drive is performed at the drive timing at which "the backward transfer channel behind the charge packet in the vertical transfer direction is turned off substantially simultaneously with turning on of the forward transfer channel ahead of the charge packet", for every charge packet unit in the vertical transfer, so that the vertical transfer can be performed during a longer overlap period of the vertical transfer clocks and, therefore, the transfer efficiency can be improved in the vertical transfer units (vertical CCDs 13).

The above drive timing can easily be applied to other ordinary drive timing. The above drive timing having a wider applicable scope realizes a versatile driving method.

When the present invention is applied to the line decimation operation, a high-speed readout operation can be realized without depending on a method for increasing the horizontal drive frequency, and other problems including a decrease in the transfer efficiency of the horizontal register or an increase in the power consumption of the horizontal register are not caused. Hence, it is possible to capture higher-speed imaging signals and to improve the transfer efficiency.

What is claimed is:

1. A solid-state imaging system comprising:
    a transfer unit having a backward transfer channel between a different transfer channel and a transfer channel array, said transfer channel array being between said backward transfer channel and a forward transfer channel:
    wherein said transfer channel array is in contact with said forward transfer channel and said backward transfer channel, said backward transfer channel being in contact with said different transfer channel,
    wherein {N} is the number of fields in a frame with said number of fields {N} being an integer amount of three or more, the number of transfer channels in said transfer channel array being {(N×2)−3},
    wherein, during a time period and a subsequent time period, said transfer unit is configured to prohibit formation of a charge well in said different transfer channel while preserving charge wells generated previously in said transfer channel array,
    wherein, during a transition from said time period to said subsequent time period, said transfer unit is configured to generate a charge well in said backward transfer channel and remove a charge well from within said forward transfer channel,
    wherein, said transition is one of many time period transitions, the exact number of time period transitions in each field of the frame being {(N×2)}.

2. The solid-state imaging system according to claim 1, wherein said transfer unit is configured to propagate a charge packet from said backward transfer channel to said forward transfer channel.

3. The solid-state imaging system according to claim 2, wherein charge wells in said backward transfer channel, said transfer channel array, and said a forward transfer channel are used to propagate said charge packet.

4. The solid-state imaging system according to claim 3, wherein a sensor converts a light beam into a signal charge, said signal charge becoming said charge packet.

5. The solid-state imaging system according to claim 4, wherein a readout gate is between said sensor and one of the transfer channels, said readout gate being configured to transfer said signal charge to said transfer unit.

6. The solid-state imaging system according to claim 4, wherein said signal charge corresponds to a light intensity of said light beam.

7. The solid-state imaging system according to claim 1, wherein said transfer unit includes a P-type well between an N-type transfer channel and an N-type substrate, said N-type transfer channel being between transfer electrodes and said P-type well.

8. The solid-state imaging system according to claim 1, wherein said number of fields is exactly three fields.

9. The solid-state imaging system according to claim 1, wherein said number of fields is exactly four fields.

10. The solid-state imaging system according to claim 1, wherein said number of fields is more than four fields.

11. The solid-state imaging system according to claim 1, wherein said number of fields is exactly {N}.

12. The solid-state imaging system according to claim 1, wherein said number of transfer channels in said transfer channel array is exactly {(N×2)−3}.

13. A camera system comprising:
    an imaging lens configured to capture an optical image of an object; and
    the solid-state imaging system of claim 1.

* * * * *

UNITED STATES PATENT AND TRADEMARK OFFICE
CERTIFICATE OF CORRECTION

PATENT NO. : 8,300,132 B2
APPLICATION NO. : 11/090111
DATED : October 30, 2012
INVENTOR(S) : Hiroaki Tanaka Page 1 of 1

It is certified that error appears in the above-identified patent and that said Letters Patent is hereby corrected as shown below:

Title page

Item (60) should read:

-- Provisional application No. 60/590,334, filed on July 23, 2004 --

Signed and Sealed this
Second Day of April, 2013

Teresa Stanek Rea
*Acting Director of the United States Patent and Trademark Office*